United States Patent
Williams

(10) Patent No.: US 9,381,973 B2
(45) Date of Patent: Jul. 5, 2016

(54) MODULAR BICYCLE

(71) Applicant: Ford Global Technologies, LLC, Dearborn, MI (US)

(72) Inventor: Bruce Preston Williams, Grosse Pointe Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/637,634

(22) Filed: Mar. 4, 2015

(65) Prior Publication Data

US 2016/0016625 A1  Jan. 21, 2016

Related U.S. Application Data

(60) Provisional application No. 62/025,526, filed on Jul. 17, 2014.

(51) Int. Cl.
| | |
|---|---|
| *B62K 3/02* | (2006.01) |
| *B62M 6/55* | (2010.01) |
| *B62K 15/00* | (2006.01) |
| *B62M 6/90* | (2010.01) |
| *B62K 3/04* | (2006.01) |

(Continued)

(52) U.S. Cl.
CPC .. *B62M 6/55* (2013.01); *B62K 3/04* (2013.01); *B62K 15/00* (2013.01); *B62K 15/006* (2013.01); *B62K 19/04* (2013.01); *B62K 19/16* (2013.01); *B62K 19/18* (2013.01); *B62M 6/90* (2013.01)

(58) Field of Classification Search
CPC ........ B62K 3/02; B62K 15/00; B62K 15/006; B62K 19/04; B62K 3/04; B62M 6/40; B62M 6/55

USPC .......................................................... 280/287
See application file for complete search history.

(56) References Cited

U.S. PATENT DOCUMENTS 3,608,917 A    9/1971  Cogliano
3,854,755 A *  12/1974 Tang ..................... B62K 15/00
                                                    280/278

(Continued)

FOREIGN PATENT DOCUMENTS

CN    2533032 Y    1/2003
CN    1836961 A    9/2006

(Continued)

OTHER PUBLICATIONS

The VeloMini folding electric bike, Aug. 4, 2010, http://www.gizmag.com/velomini-folding-electric-bike/15946/, 7 pages.

(Continued)

*Primary Examiner* — Tony Winner
(74) *Attorney, Agent, or Firm* — Frank A. MacKenzie; Bejin Bieneman PLC

(57) ABSTRACT

An e-bike center module includes a substantially straight first center module connecting surface that is releasably connectable to a substantially straight front module connecting surface. A substantially straight second center module connecting surface is releasably connectable to a substantially straight rear module connecting surface. the center module is part of a bicycle frame when the first center module connecting surface is connected to the front module connecting surface and the second center module connecting surface is connected to the rear module connecting surface.

18 Claims, 26 Drawing Sheets

(51) Int. Cl.
    *B62K 19/04* (2006.01)
    *B62K 19/16* (2006.01)
    *B62K 19/18* (2006.01)

(56) References Cited

U.S. PATENT DOCUMENTS

| | | | | |
|---|---|---|---|---|
| 4,113,271 | A * | 9/1978 | Furia | B62K 15/006 |
| | | | | 280/287 |
| 4,441,729 | A * | 4/1984 | Underwood | B62K 15/00 |
| | | | | 280/278 |
| 5,282,639 | A * | 2/1994 | Chen | B62K 3/12 |
| | | | | 280/231 |
| 6,135,478 | A * | 10/2000 | Montague | B62K 15/00 |
| | | | | 280/278 |
| 6,854,752 | B2 | 2/2005 | Chao | |
| 6,886,845 | B2 | 5/2005 | Chao | |
| 6,971,658 | B2 | 12/2005 | Chao | |
| 6,979,013 | B2 | 12/2005 | Chen | |
| 7,080,847 | B2 | 7/2006 | Chao | |
| 7,578,515 | B2 | 8/2009 | Appleman | |
| 8,469,381 | B2 | 6/2013 | Dodman et al. | |
| 8,523,212 | B2 | 9/2013 | Ryan et al. | |
| 8,556,284 | B2 | 10/2013 | Appleman | |
| 8,651,212 | B2 * | 2/2014 | Vincenz | B62H 5/001 |
| | | | | 180/205.1 |
| 2007/0273125 | A1 | 11/2007 | Appleman | |
| 2008/0088113 | A1 * | 4/2008 | Menayan | B62K 3/04 |
| | | | | 280/287 |
| 2011/0169246 | A1 * | 7/2011 | Lin | B62K 15/006 |
| | | | | 280/278 |

FOREIGN PATENT DOCUMENTS

| | | |
|---|---|---|
| CN | 2825435 Y | 10/2006 |
| CN | 2843985 Y | 12/2006 |
| CN | 2923499 Y | 7/2007 |
| CN | 200971139 Y | 11/2007 |
| CN | 201049702 Y | 4/2008 |
| CN | 201179950 Y | 1/2009 |
| CN | 102107712 A | 6/2011 |
| CN | 202029959 U | 11/2011 |
| CN | 202038426 U | 11/2011 |
| CN | 102530160 A | 7/2012 |
| CN | 102730127 A | 10/2012 |
| CN | 103057636 A | 4/2013 |
| CN | 203511923 U | 4/2014 |
| CN | 103818506 A | 5/2014 |
| EP | 1069036 A2 | 1/2001 |
| EP | 1092826 A1 | 4/2001 |
| EP | 2176117 B1 | 3/2011 |
| EP | 2724925 A1 | 4/2014 |
| GB | 2412354 A | 9/2005 |
| GB | 2499586 A | 8/2013 |
| JP | H08324477 A1 | 12/1996 |
| JP | 2001088769 A | 4/2001 |
| JP | 3289228 B2 | 6/2002 |
| JP | 2003127941 A | 5/2003 |
| KR | 20120027917 A | 3/2012 |
| NL | 286246 | 9/1965 |

OTHER PUBLICATIONS

Two Folding Electric Bikes Offer Twofold Urban Mobility Solution—Core77, Feb. 22, 2012, http://www.core77.com/blog/transportation/two_folding_electric_bikes_offer_twofold_urb . . . , 7 pages.
GB Search Report dated Jan. 11, 2016 (3 pages).

* cited by examiner

MODULAR BICYCLE

RELATED APPLICATION

This application claims priority to U.S. provisional patent application No. 62/025,526, entitled "Modular Bicycle," filed Jul. 17, 2014, the contents of which provisional application are incorporated herein by reference in their entirety.

BACKGROUND

Current portable and/or stowable bicycles generally suffer from the deficiency of not looking or performing like a typical bicycle. Folding bikes generally have a geometry to allow the bike to fold, or be collapsed, which limits how a bike frame can be designed when compared to a bike frame designed for a fixed, or non-folding, configuration). For example, wheels may be unusually small, a frame may not be full-size, etc. Further, such bicycles often are not configured to include an electric motor. Accordingly, there is a need for an improved portable, stowable, and/or electric bicycle.

DRAWINGS

DETAILED DESCRIPTION

Disclosed herein is a modular bicycle that can easily be assembled, disassembled, and reassembled. This bicycle has many advantages over bicycles that are foldable or that incorporate a fixed-geometry frame design. These advantages include being able to provide a bicycle geometry that does not make concessions, e.g., in terms of size and shape of the bicycle and/or various components, to incorporate folding mechanisms. At the same time, the presently-disclosed bicycle provides advantages previously available only with a folding bike. Moreover, the present bicycle allows for easy disassembly and reassembly with new configurations, unlike folding bicycles or conventional bicycles with fixed geometry frames.

Figure 1:
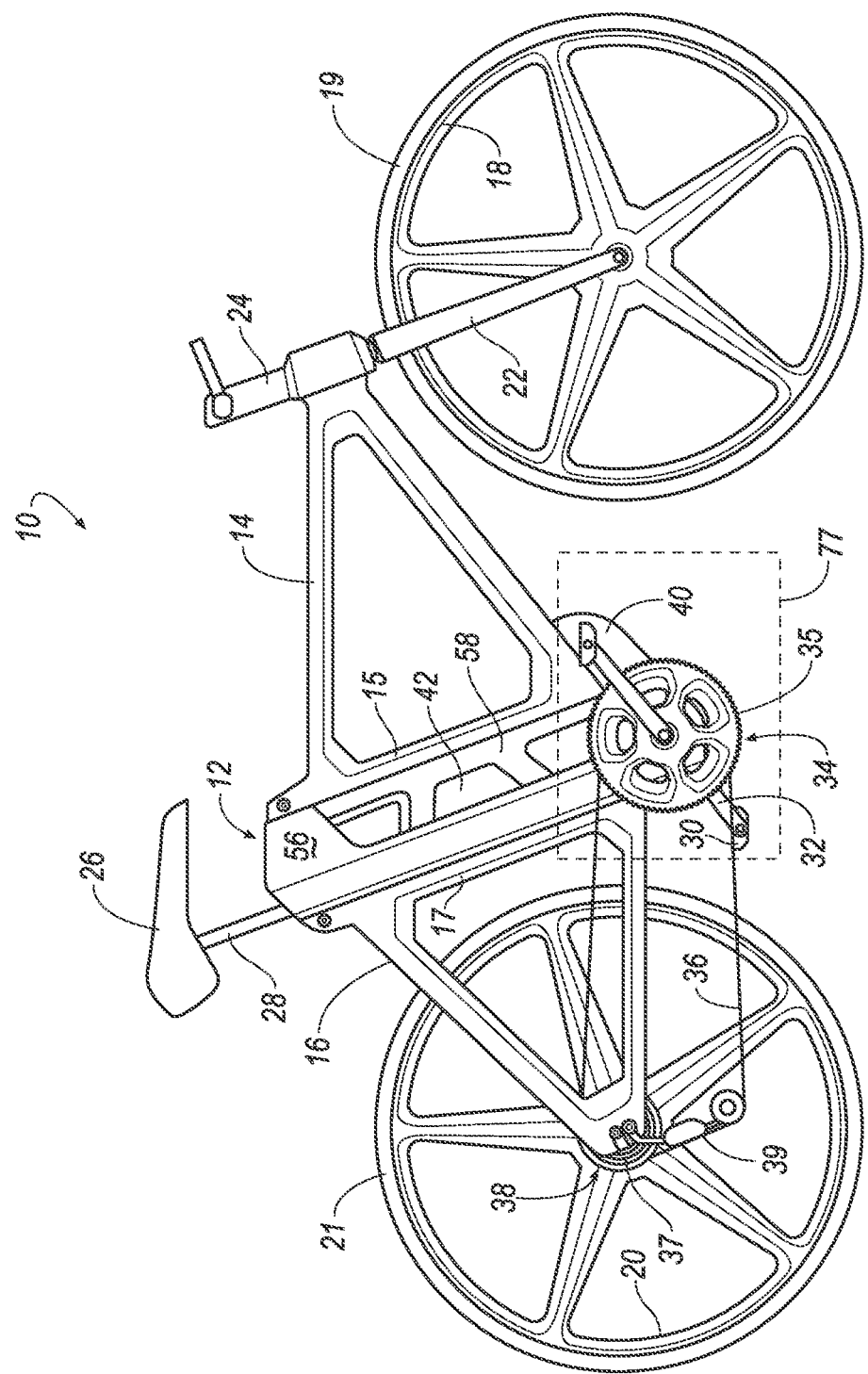
FIG. 1 is side view of an exemplary modular bicycle.
Figure 2:
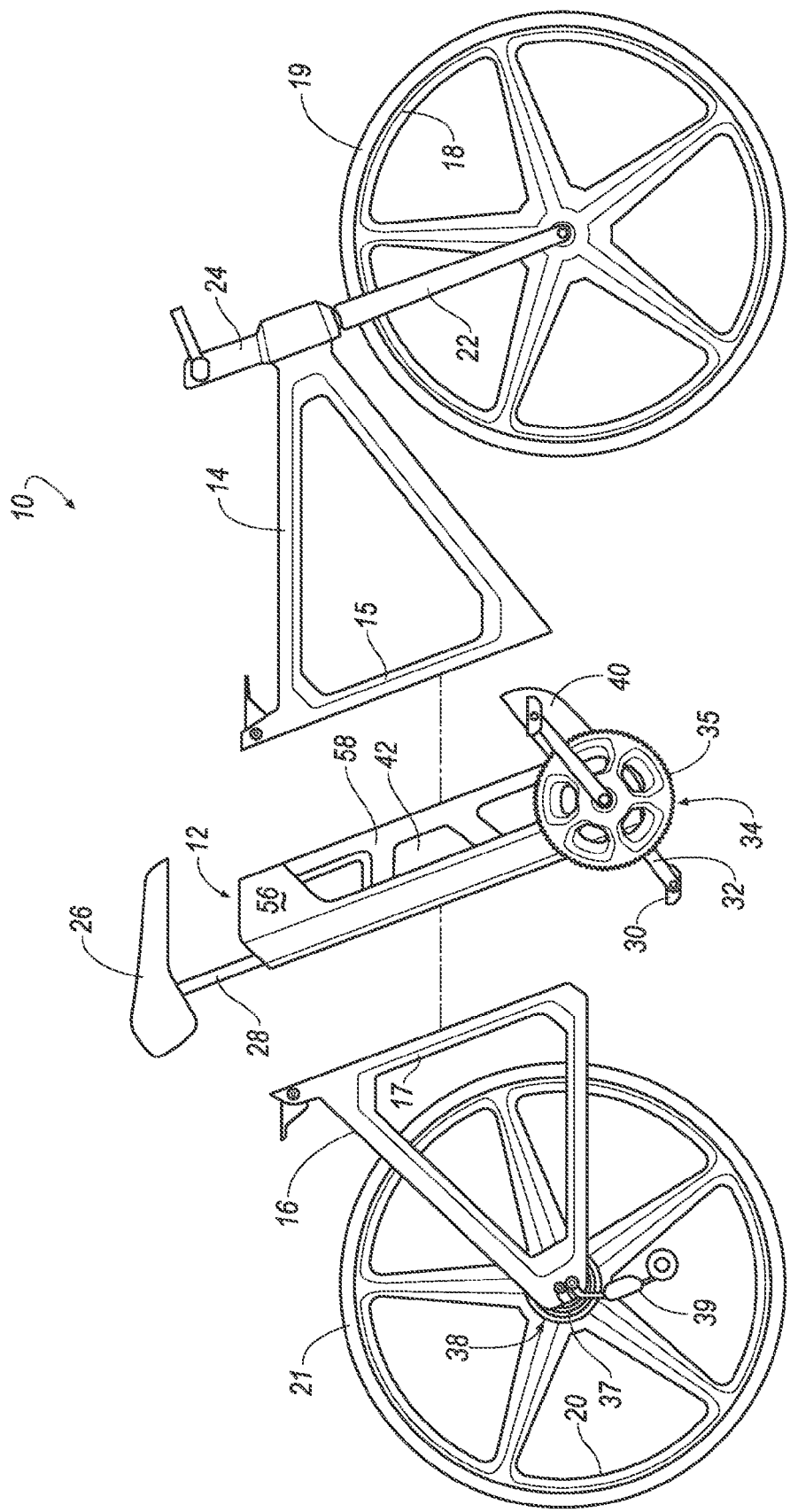
FIG. 2 is a side view of modules of the bicycle of FIG. 1.
Figure 3:
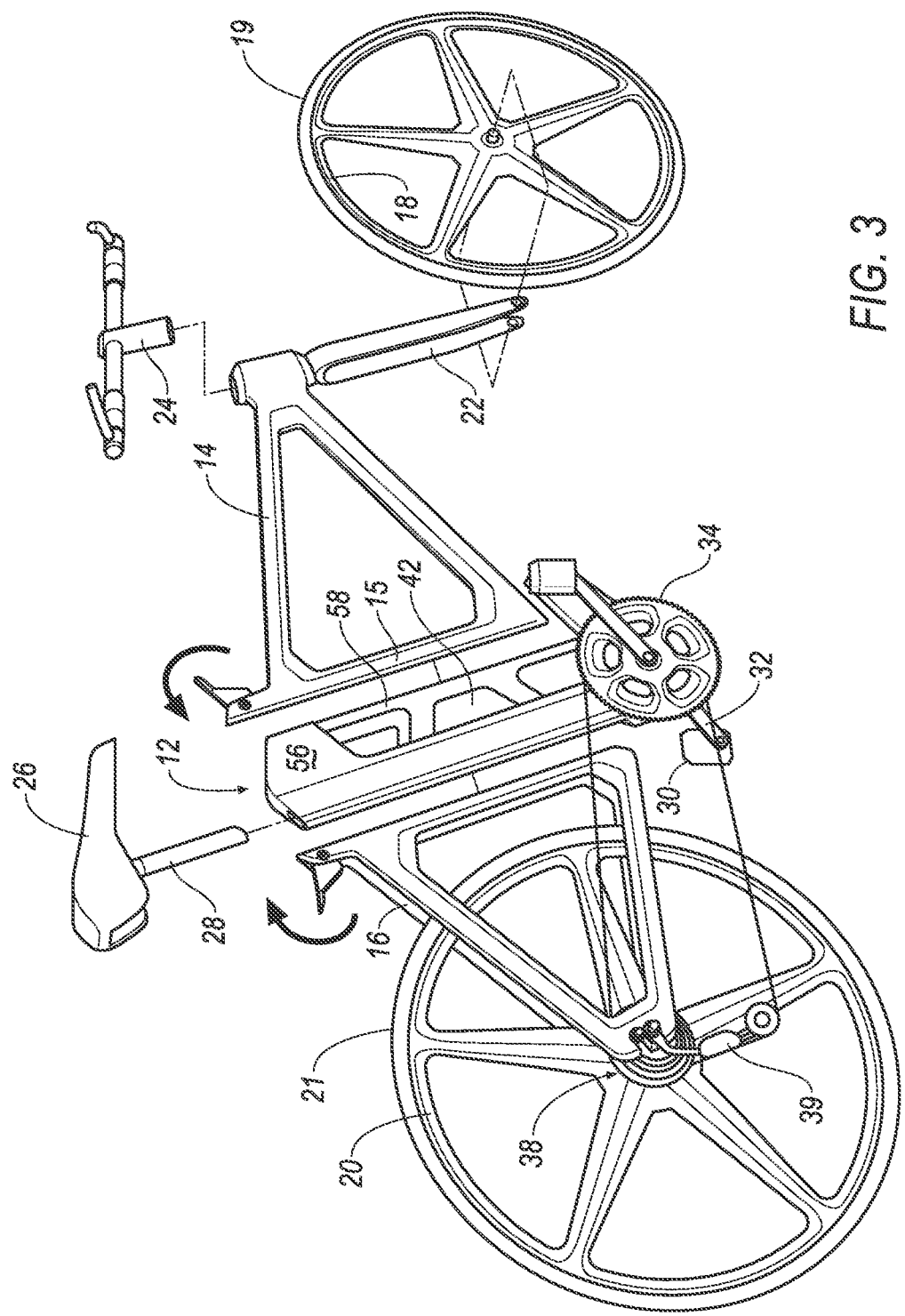
FIG. 3 is an exploded side view of the bicycle of FIG. 1.

Referring first to FIGS. 1-3, a modular bicycle 10, includes a center module 12, front module 14, and a rear module 16, the modules 14, 16 advantageously being detachable and interchangeable with respect to the center module 12. The module 12, sometimes referred to as the "core" or "spine" of the bicycle 10, includes a drive assembly 77. The drive assembly 77 includes one or more manual (e.g., pedal-powered) and/or electric-powered mechanisms, examples of which are described below herein, for driving forward progress of the bicycle 12.

The modules 14 and 16 include respective connection members 15, 17 that are substantially straight, at least for a majority portion thereof, and parallel to generally straight, e.g., planar, surfaces 51, 53 (see FIG. 5) of the center module 12, thereby facilitating easy installation and removal of a module 14 and/or 16 with the center module 12. Advantageously, therefore, the front module 14 and/or the rear module 16 can be quickly and easily connected to, and disconnected from, the center module 12. Accordingly, the bicycle 10 is easy to transport, whether being towed or wheeled by a person on foot, or stowed in luggage. Further, the modules 14, 16 are interchangeable, meaning that the center module 12 may be used for different styles of bicycle, e.g., a road or racing bike, a city bike, a mountain bike, etc. For example, such different types of bicycles can have different frame geometries, different wheel sizes, different tire diameters, different suspension types, etc.

Figure 4:
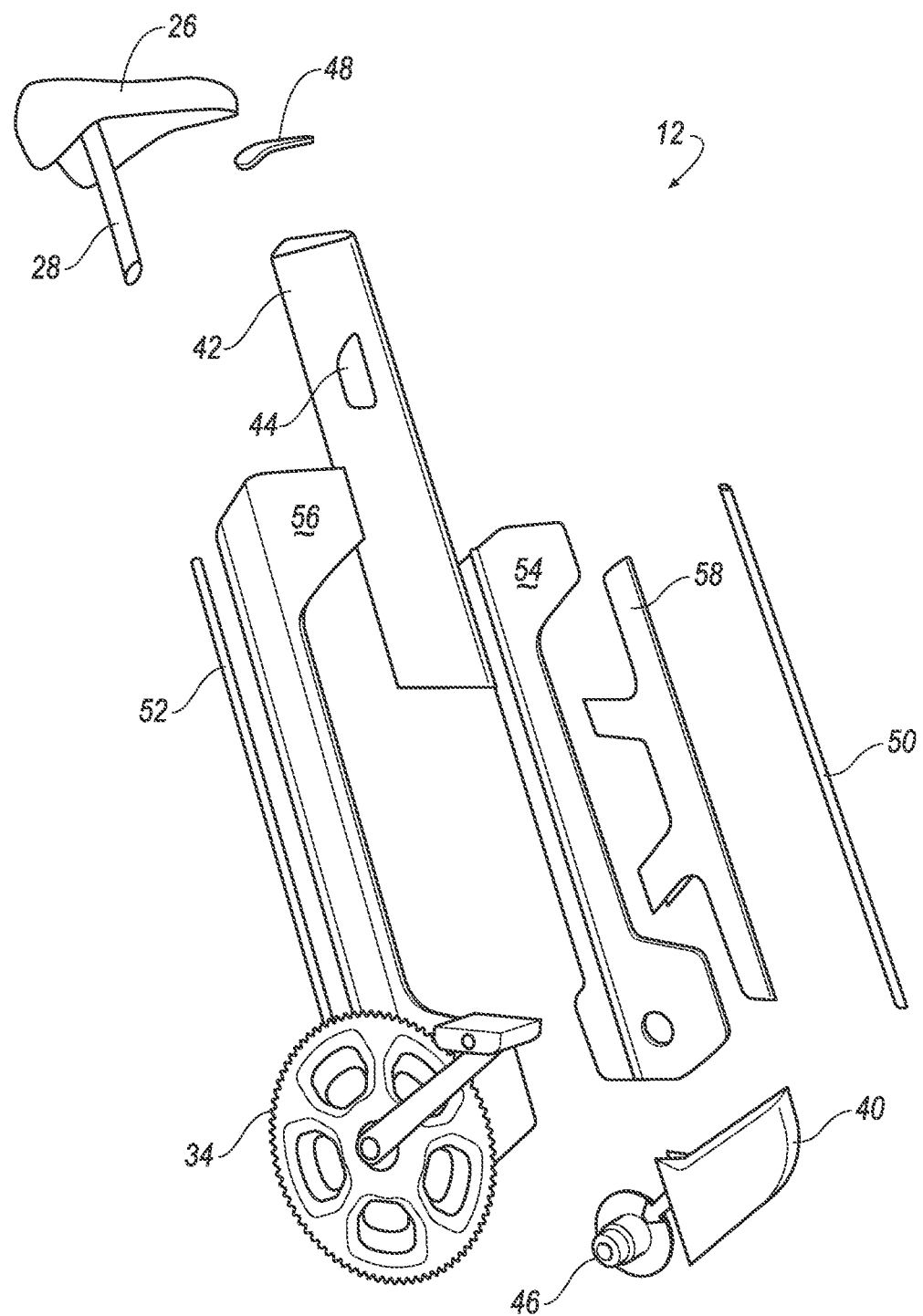
FIG. 4 is an exploded view of an exemplary center module of the bicycle of FIG. 1.

Moreover, the center module 12 is designed to accommodate a battery 42 and a mid-drive motor 46 (seen, e.g., in FIG. 4). As further discussed below, the center module 12 is designed for easy installation and/or replacement of the battery 42, as well as for connection of the battery 42 to electrical elements in the modules 14, 16.

The front module 14 includes a front tire 19 mounted on a front wheel 18 in a conventional manner. Further, the wheel 18 is connected to a fork 22 of the front module 14 in a conventional manner, e.g., with a quick-release mechanism or the like known for allowing a bicycle wheel to be quickly engaged with and disengaged from a fork 22. Similarly, the rear module 16 includes a rear wheel 20 with a tire 21 mounted thereon, the wheel 20 being connected to the frame 16 in a generally conventional manner. Moreover, the front module 14 generally includes a handlebar stem 24 having handlebars 25 affixed thereto. The handlebar stem 24 and/or the handlebars 25 may include electrical sockets or outlets to accommodate lamp assembles, smartphones, navigational systems, etc. Electrical power for such electrical outlets may be provided through wires in the front module 14, powered from the battery 42 as described further below.

Figure 5:
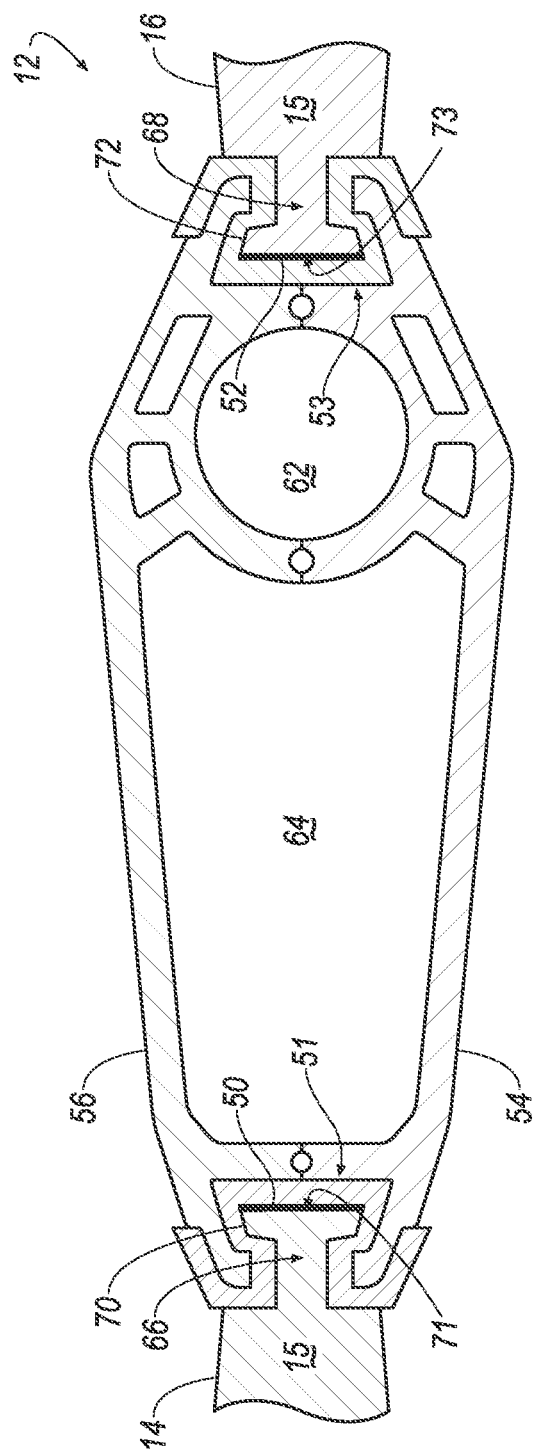
FIG. 5 is a top view of an exemplary center module of the bicycle of FIG. 1.
Figure 8:
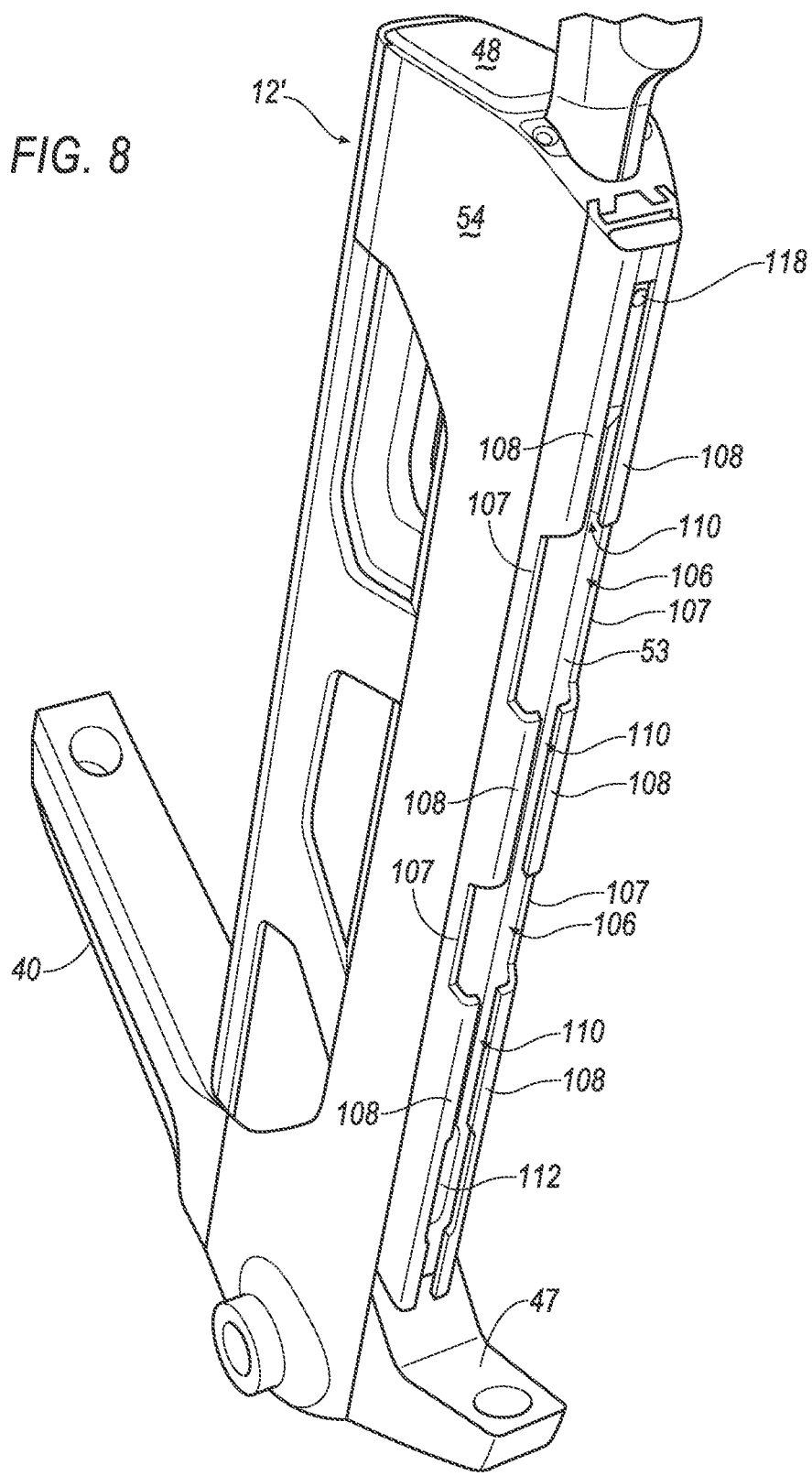
FIG. 8 is a perspective view of a center module of the exemplary modular bicycle of FIG. 6.
Figure 9:
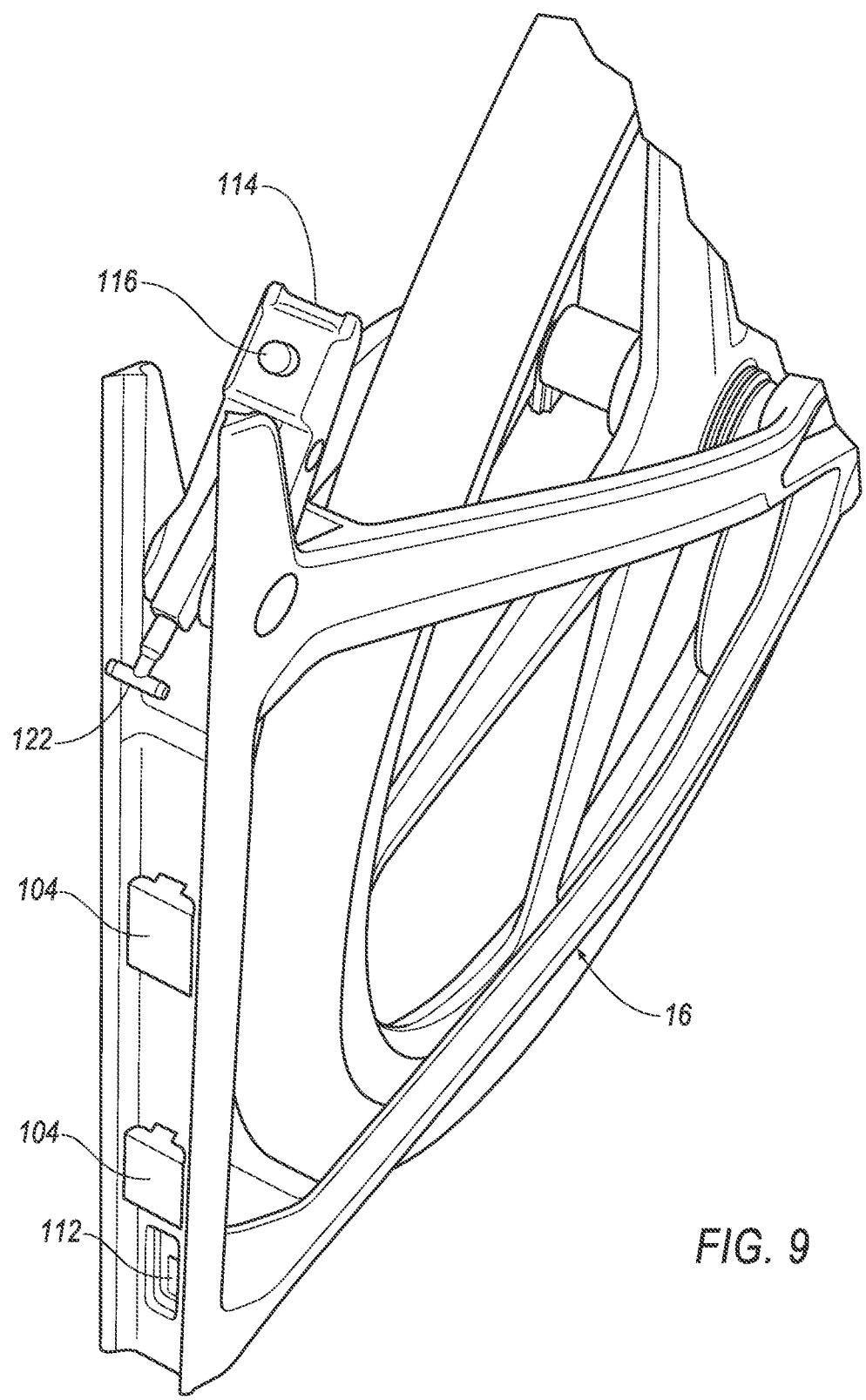
FIG. 9 is a perspective view of a center module of the exemplary modular bicycle of FIG. 6.
Figure 12:
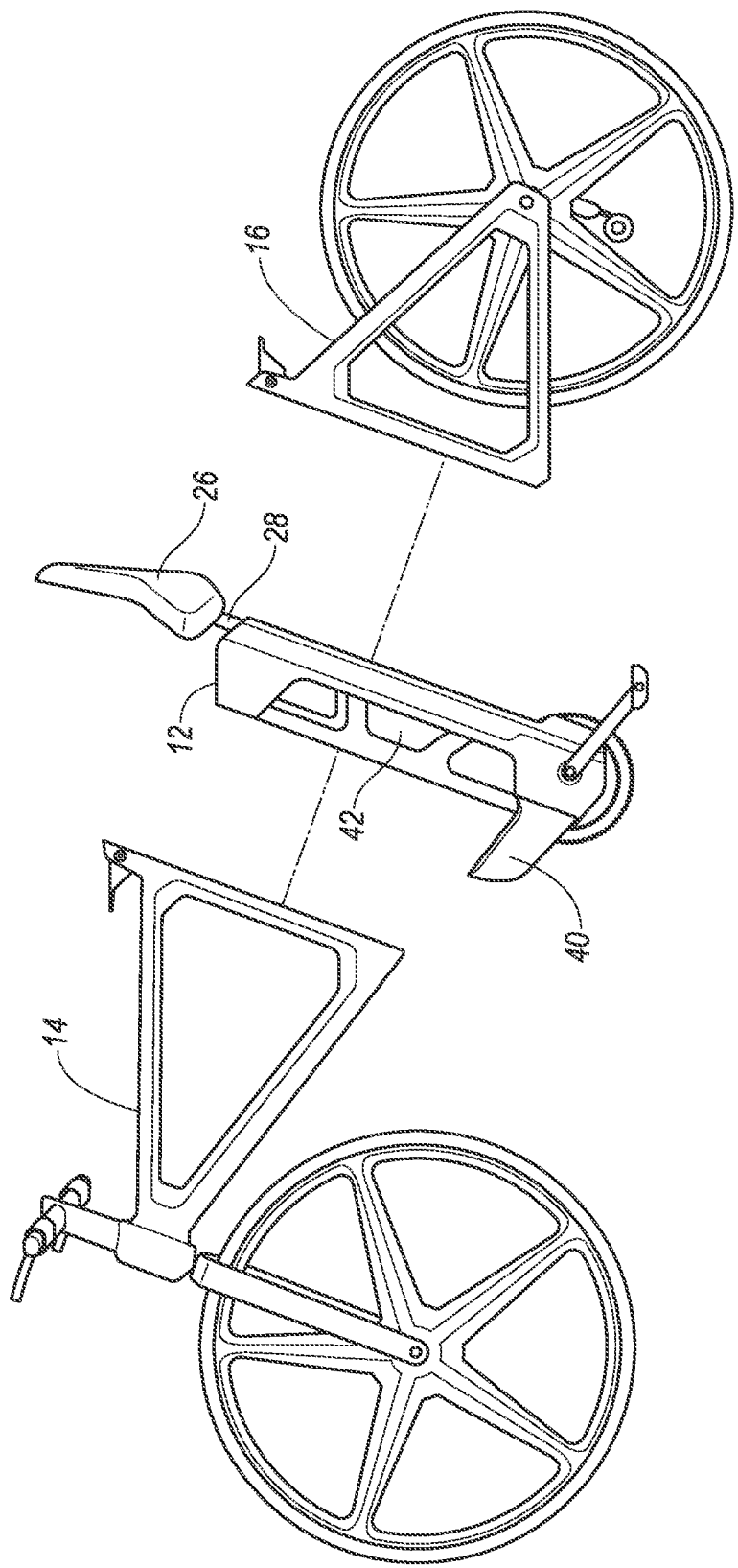
FIG. 12 is a side view of a center module of the bicycle of FIG. 1 with a seat in a battery replacement mode.

The center module 12 includes a seat 26 mounted on a seat stem 28, the seat stem 28 being held in an opening 62 (seen in FIG. 5). The seat 26 may be positioned in a riding mode, i.e., substantially horizontally, as shown in FIGS. 1-3, e.g., in a conventional manner for riding the bicycle 10, or may be positioned in a battery replacement mode (see FIGS. 8-9), i.e., flipped to a substantially vertical position, for easy installation and/or replacement of the battery. Advantageously, therefore, the battery 42 can be easily removed for recharging, or to prevent theft while the bicycle 10 is parked in a public location. For example, the seat 26 may be bolted or otherwise affixed to an axis at or near a top end of the seat stem 28, and may be rotated about the axis to transition the seat from a riding mode to a battery replacement mode. Accordingly, as seen in FIG. 8, in a riding mode the seat 26 has a substantially horizontal top surface, whereas in the battery replacement mode illustrated in FIG. 12, the seat 26 has a substantially vertical top surface.

The center module 12 also accommodates a front sprocket set 34 that includes one or more front sprockets 35. The sprockets 35 are toothed in a conventional manner for accommodating a bicycle chain 36, and are generally arranged for providing a conventional gearing system for the bicycle 10. Further, one or more sprockets 35 are mounted on a common shaft 86 (seen in FIG. 10) with pedal crank arms 32, that in turn accommodate pedals 30. The chain 36 is connected to a rear sprocket 37, a sprocket set 38 including one or more sprockets 37. The sprockets 37 are toothed in a conventional manner for accommodating a bicycle chain 36, and are generally arranged, along with a derailleur 39, to provide a conventional gearing system for the bicycle 10.

Referring now particularly to FIGS. 4 and 5, the center module 12 includes side panels 54, 56, that, together with a top cover 48 and a front housing panel 58, form a battery compartment 64. The battery 42 is provided with a size and shape for installation in the compartment 64, i.e., a length and width, and generally also a height, of the battery 42 are such that the battery 42 can be easily inserted and removed from the compartment 64, but also fits snugly therein. Further, the panels 54, 56, and 58 provide access to a battery opening 44 that allows for use of a securing mechanism, e.g., a chain or cable lock, to prevent theft of or tampering with the battery 42. The opening 44 also provides a handle for transport of the battery 42, and a surface for grasping the battery 42 during installation and removal in the battery compartment 64. When the battery 42 is installed in the battery compartment 64, the battery 42 establishes electrical contact with the mid-drive motor 46 included in the mid-drive motor housing 40. The mid-drive motor housing 40 may be provided with spines, vents, etc. to facilitate cooling of the mid-drive motor 46.

The center module 12 may further include battery connectors, e.g., busbars, 50, 52. The connectors 50, 52 are generally respectively affixed to a front connecting surface 51 and a rear connecting surface 53 formed by the panels 54, 56. As is known, a busbar or the like may be used to conduct electricity. Accordingly, the busbars 50, 52 may be connected to an electrical connection that is in turn connected to positive and negative terminals of the battery 42. The busbar 50 may in turn be connected to one or more electrical connections, e.g., wires disposed in a hollow interior of the module 14, and leading to various electric-powered elements, such as a headlamp or other lights, a smart phone dock, etc. Similarly, the busbar 52 may be connected to one or more electrical connections disposed in a hollow interior of the module 14 for powering a tail lamp, other lights, and/or other electrical elements.

As illustrated in FIG. 5, T-shaped extensions 70, 72 of the modules 14, 16 members 15, 17, respectively, are configured to be slidably installed in respective T-shaped slots of the center module 12. Accordingly, substantially straight, e.g., planar, connection surfaces 71, 73 of the extensions 70, 72 may contact the substantially planar busbars 50, 52 and/or connecting surfaces 51, 53. As mentioned above, the surfaces 51, 53, as well as the surfaces 71, 73 may be substantially straight, e.g., planar, and are generally all substantially parallel to one another.

Accordingly, the module 14 may be installed with respect to the module 12 by sliding the T-shaped extension 70 into the front T-shaped slot 66, whereby the surfaces 71 and 51 and/or the busbar 50, will be in contact. Likewise, the module 16 may be installed with respect to the module 12 by sliding the T-shaped extension 72 into the rear T-shaped slot 68, whereby the surfaces 73, 53 and/or the busbar 51, will be in contact. By reversing the foregoing procedures, the modules 14, 16 may be uninstalled with respect to the center module 12. Further, installation and/or removal of a module 14, 16 may include use of a locking and/or quick-release mechanism 91, discussed below with respect to FIG. 11.

Figure 10:
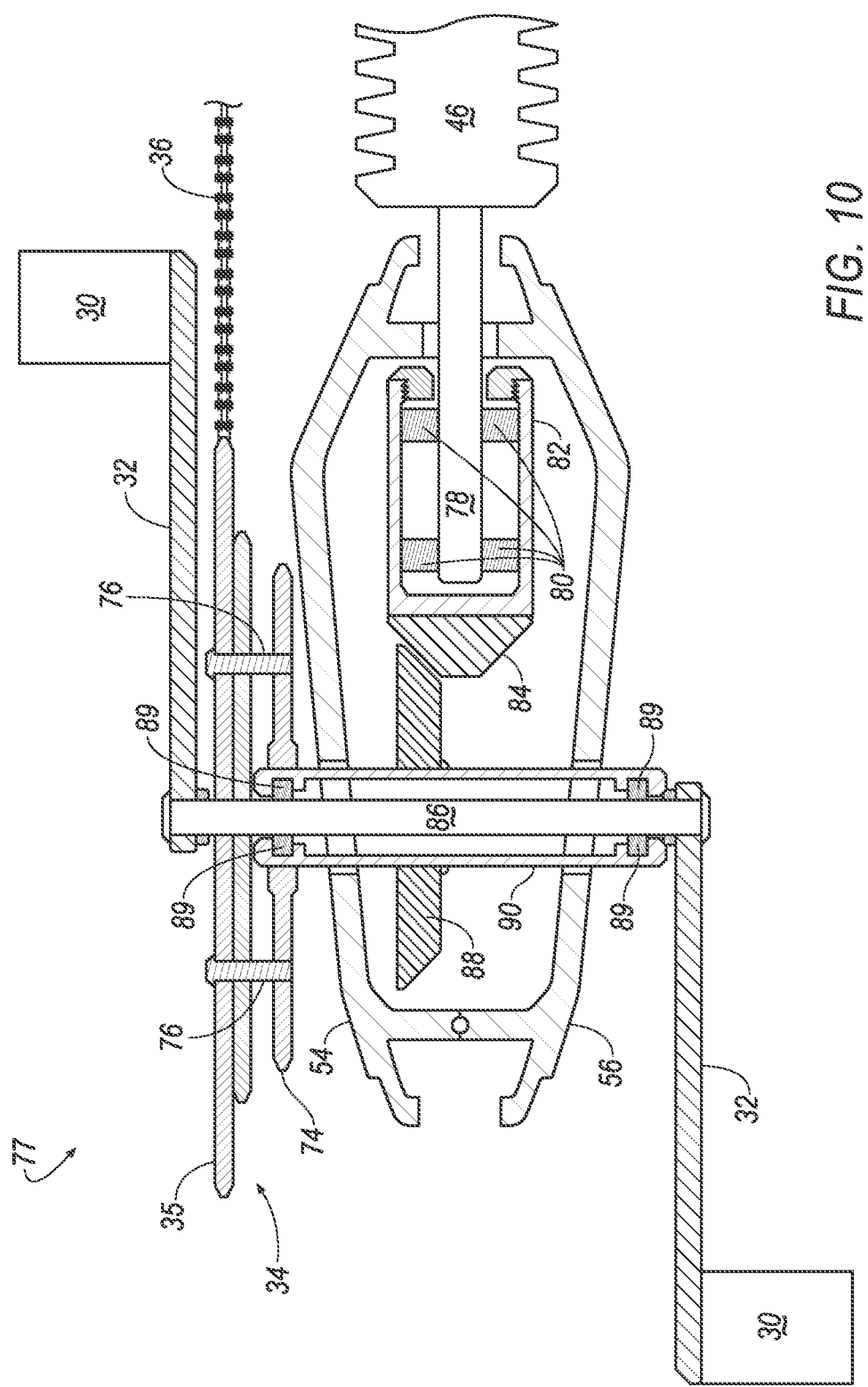
FIG. 10 is a top view of an exemplary drive assembly of the bicycle of FIG. 1.

FIG. 10 provides a top view of the drive assembly 77. The motor 46 powers rotation of the driveshaft 78, which may be engaged to cause rotation of a gear body 82 via one-way clutches 80. The clutches 80 may also act as bearings, and are sometimes referred to as clutches/bearings 80. One end of the clutch body 82, which is substantially cylindrical, may be frusto-conical and toothed or the like so as to form a beveled gear end 84. The gear and 84 engages with a beveled gear 88 that is attached, e.g., welded and/or mechanically fastened, etc., to a substantially cylindrical shaft cover 90. The shaft cover 90 engages with a crank shaft 86 via one-way clutches/bearings 89. The pedal 30 crank arms 32 are fixedly attached to the shaft 86.

When the clutches 89 engage the crankshaft 86, torque resulting from pedaling the bicycle 10 causes rotation of the wheel 74, which in turn causes rotation of a sprocket 35 on which the chain 36 connected to a rear sprocket 37 of the rear sprocket 38 is drivingly engaged. That is, when the clutches 89 engage the crankshaft 86, pedaling by a rider of the bicycle 10 causes forward movement of the bicycle 10 and/or assists forward movement of the bicycle 10 also being driven by the motor 46.

As illustrated in FIG. 10, the driveshaft 78, gear body 82, clutches 80, beveled gear 88, and at least a portion of the shaft cover 90 may be included between the side panels 54, 56, e.g., below the battery 42 in the central module 12. For example, the compartment 64 may have a floor partition (not shown), or some other element on which a bottom of the battery 42 rests, providing space for the foregoing portions of the drive assembly 77.

In addition to the beveled gear 88, a motor-driven disk 74 may be attached to the shaft cover 90, e.g., via welding or the like, so that rotation of the shaft cover 90 causes rotation of the disk 74. Two or more connecting pins 76 connect the disk 74 to the sprocket set 34, e.g., to an innermost sprocket 35. When the motor 46 is activated to cause rotation of the driveshaft 78, and the clutches 80 are engaged, the beveled gear end 84, engaged with the beveled gear 88, causes or assists (i.e., if the clutches 89 are engaged) the driving rotation of the disk 74, and hence the sprocket 35.

Figure 11:
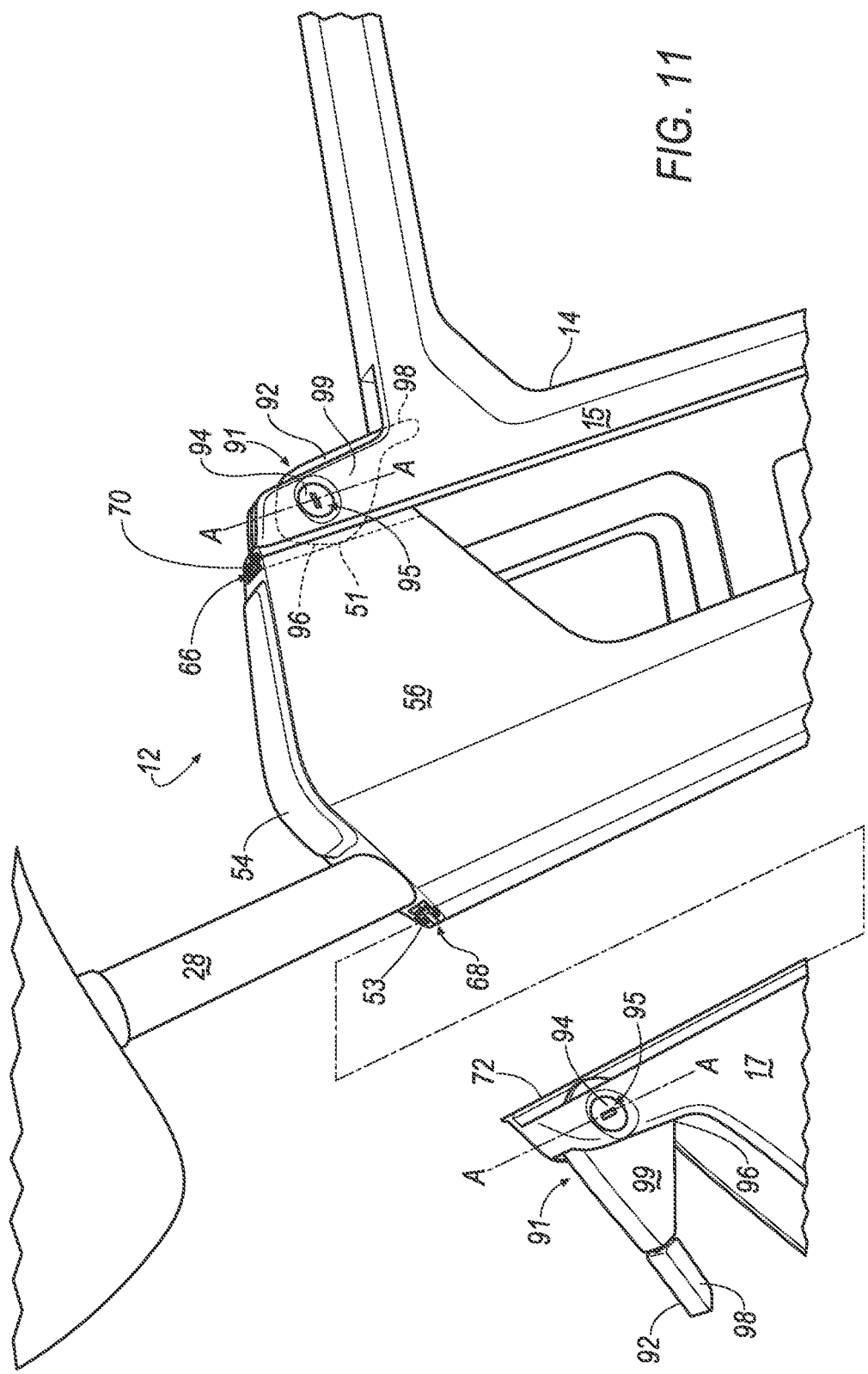
FIG. 11 is a perspective view of a portion of the bicycle of FIG. 1 including a quick-release locking mechanism.

FIG. 11 illustrates a locking and release mechanism 91, generally an alternative to the mechanism 116 discussed above, that includes a pressure locking member 92 rotatably affixed about an axis A, e.g., via a bolt, a cylinder included in a lock 94, etc., inserted into a lock opening 95 in one of the module 14, 16 members 15, 17. Rotation of the locking member 92 is permitted or prevented depending on whether a lock 94 is disengaged or engaged, i.e., unlocked or locked.

The locking member 92 includes a lever tab 98, and a pressure lock portion 99, the portion 99 including a generally curvilinear bulging engagement surface 96. The pressure lock portion 99 is shaped such that the engagement surface 96 engages or contacts a surface 51 or 53 of the central module 12 when the locking member 92 is in an engaged or locked position, but does not engage or contact a surface 51 or 53 when the locking member 92 is not in an engaged or locked position. Note that the engagement surface 96 could engage one of the busbars 50, 52, which have been omitted from FIG. 11 for ease of illustration.

As shown in FIG. 11, the pressure locking member 92 attached to the member 17 of the rear module 16 is in an unlocked, or disengaged state. When the locking member 92 is in a disengaged state, the T-shaped tab 72 of the member 17 can be inserted into the T-shaped slot 68 without the engagement surface 96 of the locking member 92 engaging the surface 53 and preventing the 72 from being slid into the slot 68. Alternatively, although not shown in the figures, the locking member 92 could be in a disengaged state while the modules 16, 12 are connected, i.e., the T-shaped tab 72 has been inserted in the T-shaped slot 68, whereupon the module 16 may be disconnected from the center module 12, i.e., the module 16 may be slid upward such that the T-shaped tab 72 is removed from the T-shaped slot 68.

As further shown in FIG. 11, the pressure locking member 92 attached to the member 15 of the front module 14 is in a locked, or engaged state. When the locking member 92 is in an engaged state, and the T-shaped tab 70 of the member 15 is positioned in the T-shaped slot 66, whereby the front module 14 is connected to the center module 12, the contact surface 96 is engaged with the surface 51 of the module 12. Thus, in the engaged state of the locking member 92, friction between the surfaces 51 and 96 prevents removal of the module 14 from the module 12, i.e., prevents the module 14 from being slid upward along the slot 66 with respect to the module 12.

FIGS. 6, 7, 8, and 9 illustrate alternative connecting and securing mechanisms for a bicycle 10', including front, center, and rear modules 12', 14', 16', similar to the bicycle 10 described herein but varying with respect to elements as described herein. The front and rear modules 14', 16' can be provided with securing tabs 104 disposed along the planar surfaces 71, 73. The securing tabs 104 may be dimensioned for insertion in tab receiving openings 106. Each opening 106 is defined by a location between curved flanges, also referred to as securing lips, 108, and by guide walls 107 located on respective sides of respective planar surfaces 51, 53. The lips 108 are located on respective sides of the respective planar surfaces 51, 53, and curving inwardly therefrom to securingly engage tabs 104. The tabs 104 are generally T-shaped, and are configured to thereby slide into slots 110 formed by the lips 108 to retain the tabs 4.

Figure 6:
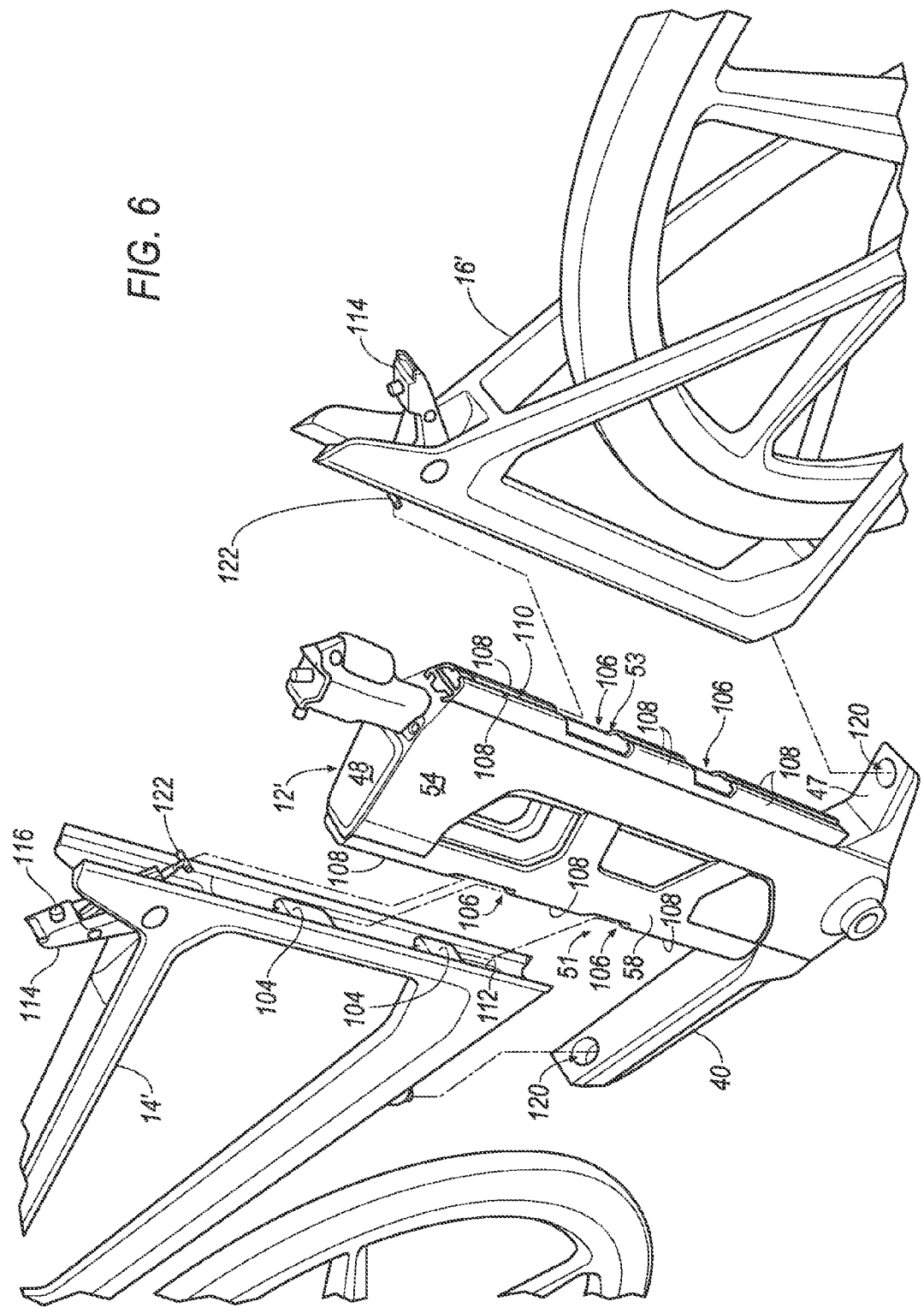
FIG. 6 is an exploded perspective view of a portion of an exemplary modular bicycle that includes alternative connecting and securing mechanisms.
Figure 7:
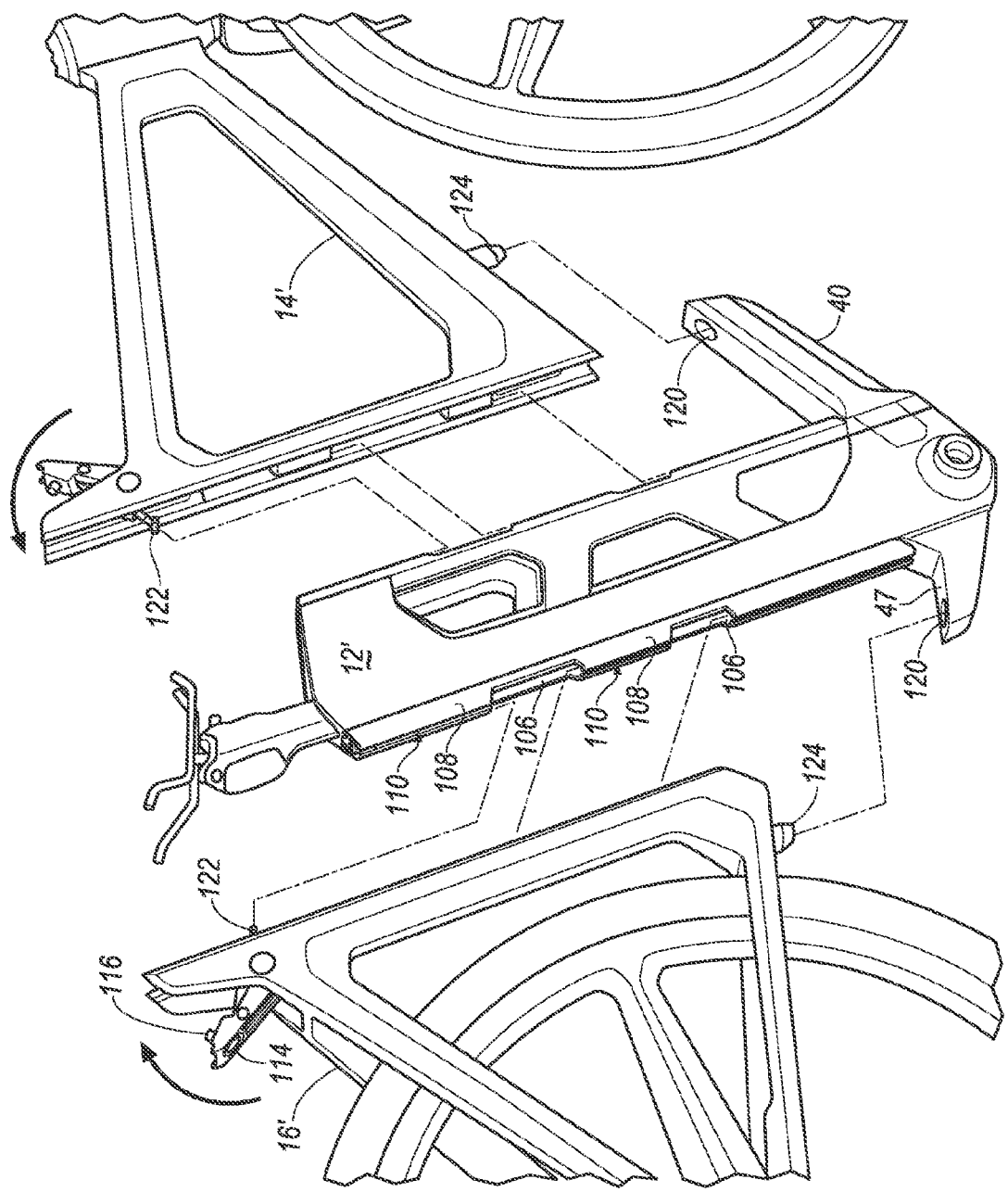
FIG. 7 is another exploded perspective view of a portion of the exemplary modular bicycle of FIG. 6.

Continuing with the example of FIGS. 6, 7, and 8, each of the front and rear modules 14', 16' includes a pivoting securing member 114 having a lock mechanism 116, e.g., a key mechanism, a threaded bolt, or the like, attached thereto and securable to a lock receptacle 118 provided on the center module 12' to receive and secure the lock mechanism 116. A lock extension 12'2, which may be, for example, T-shaped, extends from a bottom end of the pivoting securing member 114.

Attachment of a module 14', 16' to the center module 12', in the example of FIGS. 6, 7, and 8 may be achieved by first inserting the lock extension 12'2 into an uppermost slot 110 of a planar surface 51 or 53. The lock extension 12'2 may then be moved to an uppermost position in the slot 110, whereupon tabs 104 of the module 14', 16' are positioned in respective openings 106. At this point, the pivoting member 114 is in a relaxed, or unsecured position, e.g., as seen in FIGS. 6 and 8, generally at an angle to a planar surface 71 or 73. Rotation of the member 114 in the direction of the arrow shown in FIG. 6, i.e., toward the center module 12', whereupon the position of the lock extension 12'2 in the slot 110 forces a planar surface 71, 73 of a module 14', 16' to mate with, and slide downward with respect to, a planar surface 51, 53 of the center module 12'.

When the pivoting member 14' is substantially aligned with a planar surface 71, 73, engagement mechanisms such as pins 12'4 engage receptacles 12'4 locates on an upper surface of a rear frame support and an upper surface of the motor housing 40, respectively. Further, the lock mechanism 116 becomes engaged with the lock receptacle 118, e.g., a bolt or key may be turned to achieve secure engagement of the mechanism 116 in the receptacle 118. Further, the tabs 104 will have slid into the slots 110 to be thereby secured by the lips 108, whereupon the module 14', 16' is secured to the center module 12'. It will be understood that reversing the procedure just described will allow a module 14', 16' to be separated from the center module 12'. Accordingly, different modules 14', 16' of the bicycle 14' can be easily swapped and exchanged in the example of FIGS. 6-9, as with the example above.

Further, note that electrical connection opening 112 may be provided to allow electrical connectors such as plugs or the like to be used to connect the module 12' with one or both of the modules 14', 16'. The connection opening 112 may be provided to allow connections as an alternative, or in addition, to connectors, e.g., busbars 50, 52.

Figure 14:
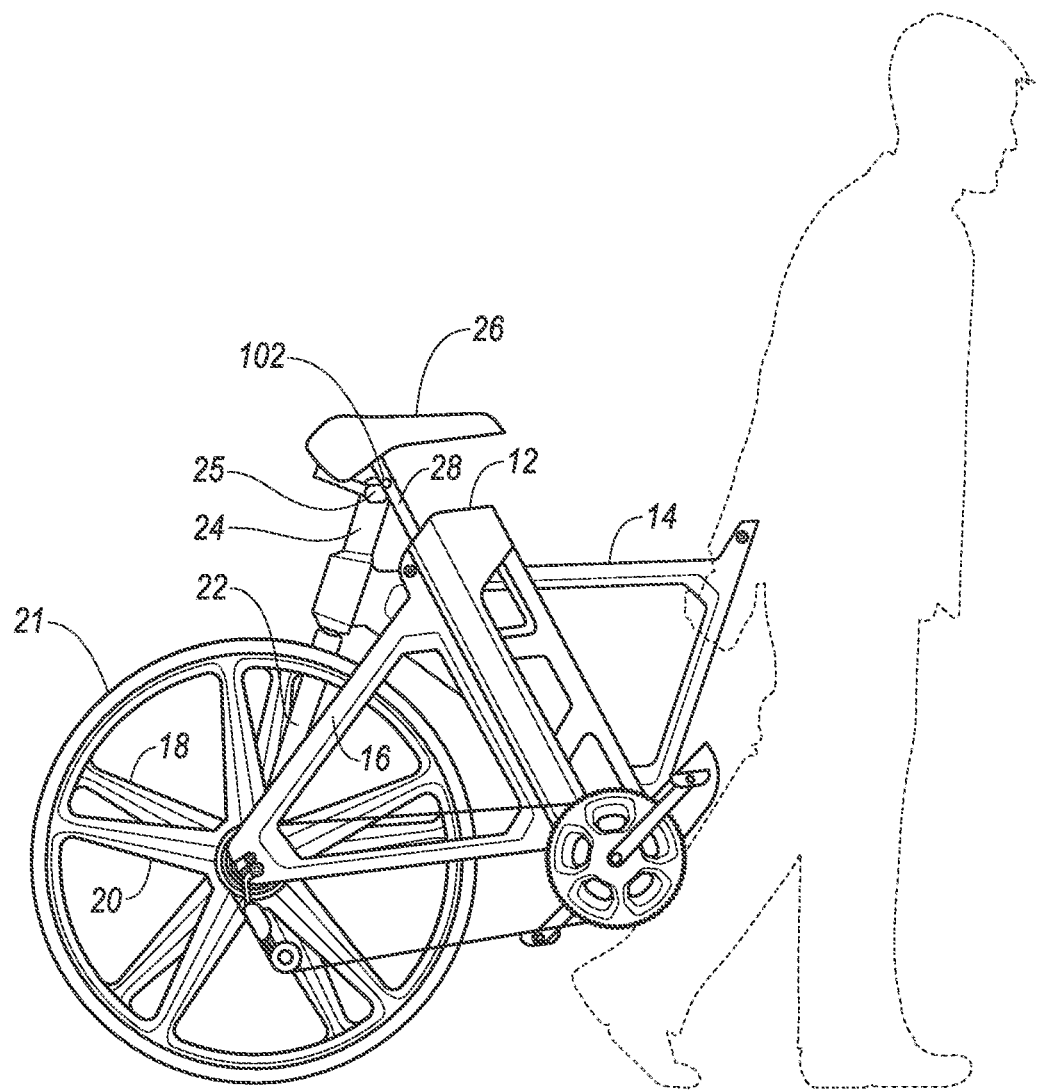
FIG. 14 is a side view of the bicycle of FIG. 1 in a towable configuration.
Figure 15:
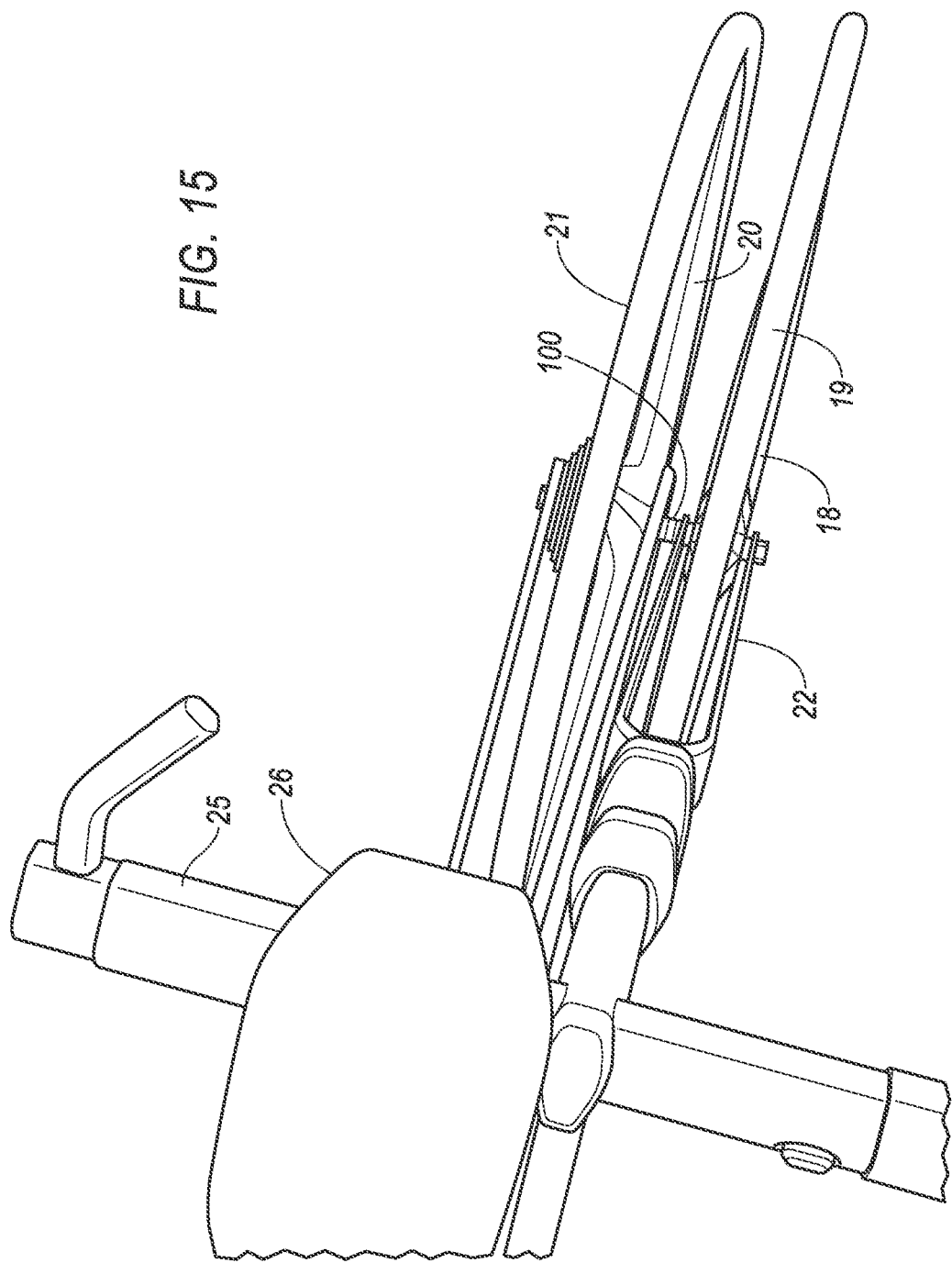
FIG. 15 is a top perspective view of the bicycle of FIG. 1 in a towable configuration.
Figure 16:
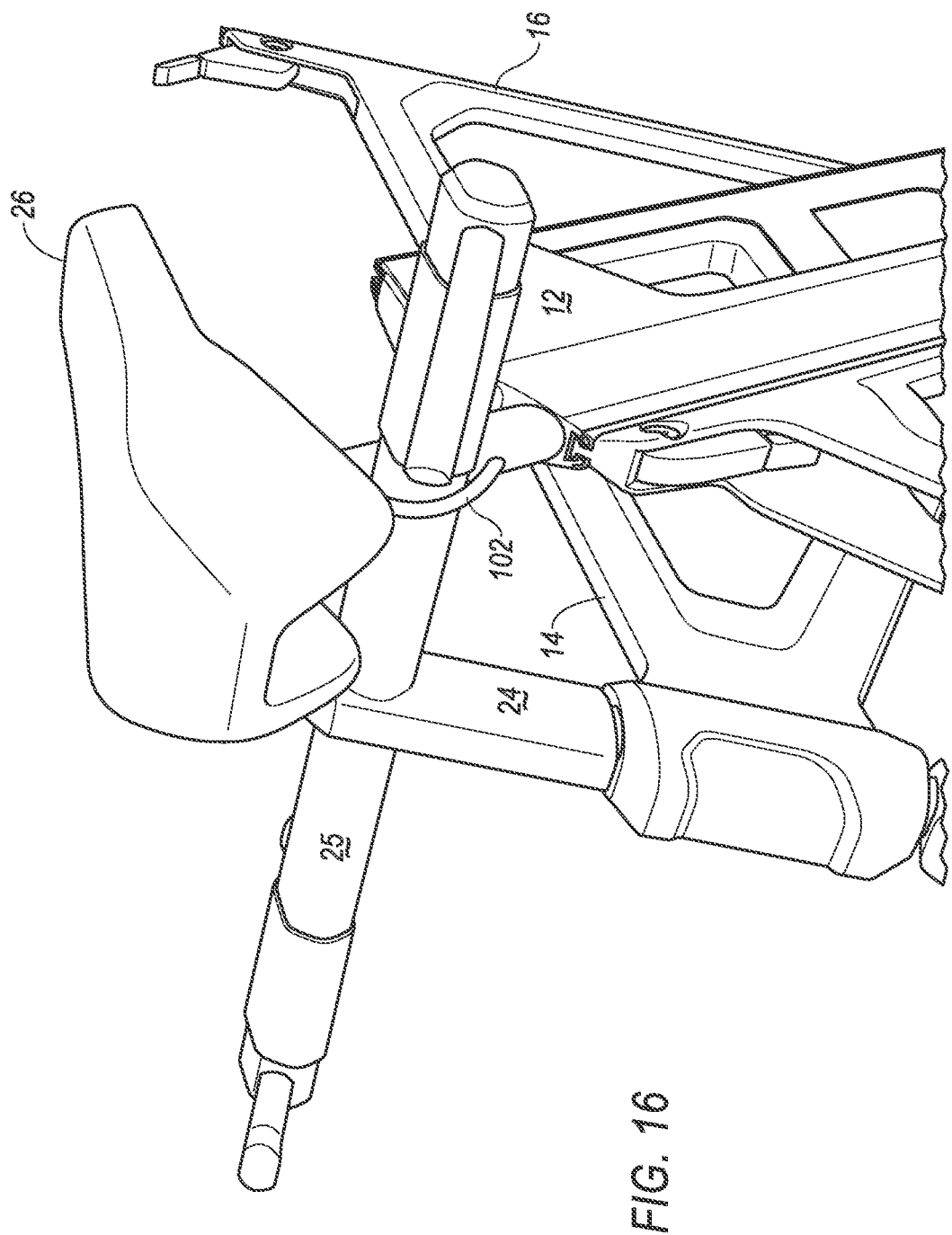
FIG. 16 is a top perspective view of a portion of the bicycle of FIG. 1 in a towable configuration.

FIG. 14 is a side view of the bicycle 10 in a towable configuration. FIG. 15 is a top view of the bicycle 10 in a towable configuration. FIG. 16 is a perspective view of a portion of the bicycle 10 in a towable configuration. As seen in these figures, the front module 14 may be disconnected from the center module 10, and then connected to the module 16 to place the bicycle 10 in a towable configuration.

For example, wheels 18, 20, may be connected by a connection mechanism 100. The connection mechanism 100 allows the wheels 18, 20, to roll in tandem while secured to one another. The connection mechanism 100 may be any one of a variety of known devices. For example, quick disconnect couplings are known for use with implements used on pneumatic tools. Accordingly, the connection mechanism 100 could include male and female components of such a coupling. The male component could be mounted on an axle of one of the wheels 18, 20, and the female component could be mounted on an axle of the other one of the wheels 18, 20. To place the bicycle 10 in a towable configuration, once the module 14 had been disconnected from the module 12, the module 14 could then be connected to the module 16 with the connection mechanism 100 as a step in placing the bicycle 10 in a towable configuration. Likewise, disconnecting the module 14 from the module 16 could include disconnecting the connection mechanism 100, e.g., using a quick-release function.

A second connection mechanism 102 attaches the module 14 to the center module 12, e.g., the handlebars 25 and/or handlebar stem 24 may be secured to the seat stem 28. The connection mechanism 102 may include one or more known components, e.g., magnets, a clamp, e.g., a C-clamp or the like.

Figure 13:
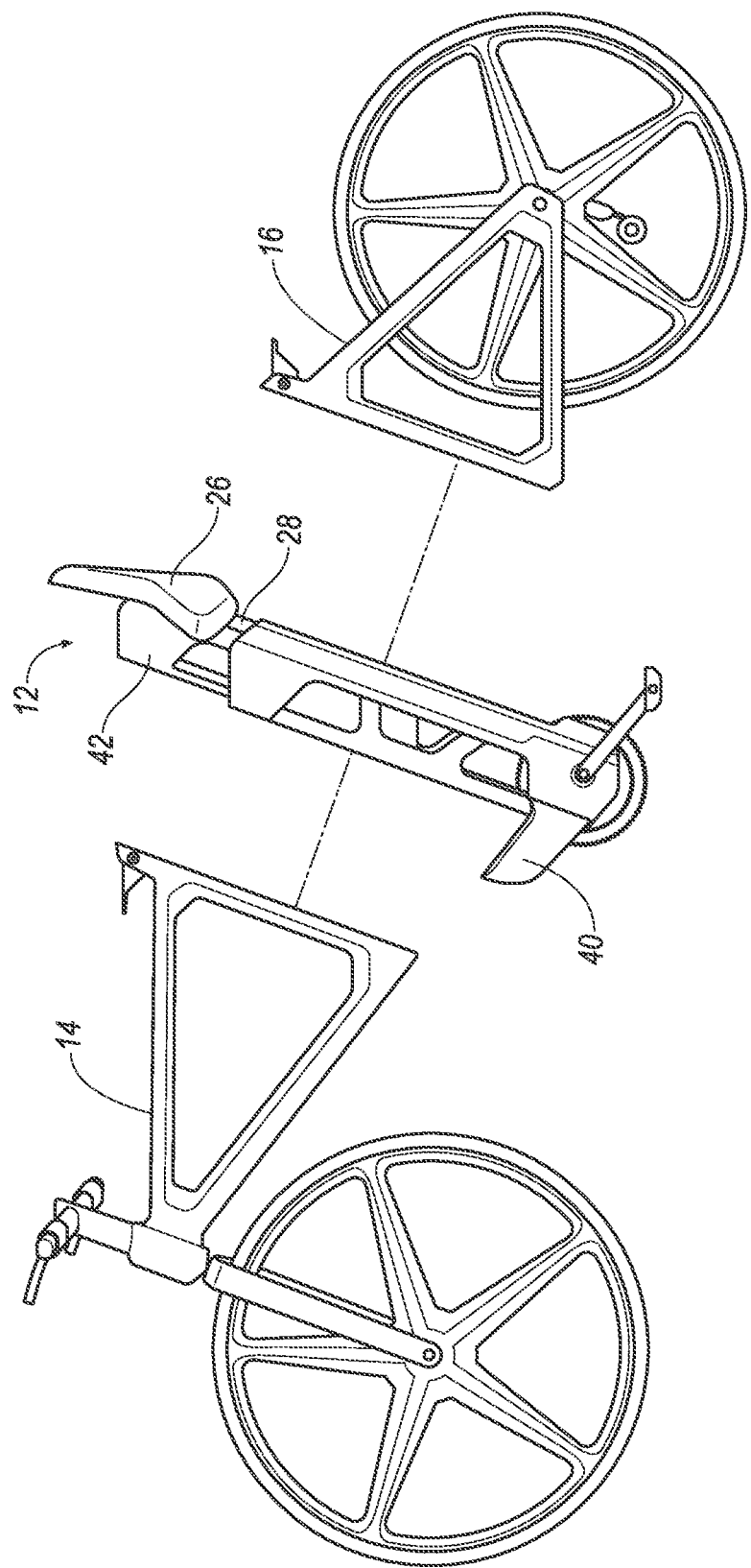
FIG. 13 is a side view of a center module of the bicycle of FIG. 1 with a seat in a battery replacement mode.

Accordingly, two separate sets of components of the bicycle 10, a first set of components including the front module 14, and a second set of components including the center module 12 in the rear module 16, can be secured so that the modules rotate together with respect to the wheels 18, 20, i.e., the first and second sets of components of the bicycle 10 are prevented from rotating separately with respect to the wheels 18, 20. Accordingly, a user can grasp a portion of the bicycle 10, e.g., a portion of the front module 14 as shown in FIG. 13, to tow the bicycle 10. Alternatively or additionally, a towbar or other mechanism could be provided for the bicycle 10 to be towed by a vehicle such as a motorcycle, a car, etc.

Figure 17:
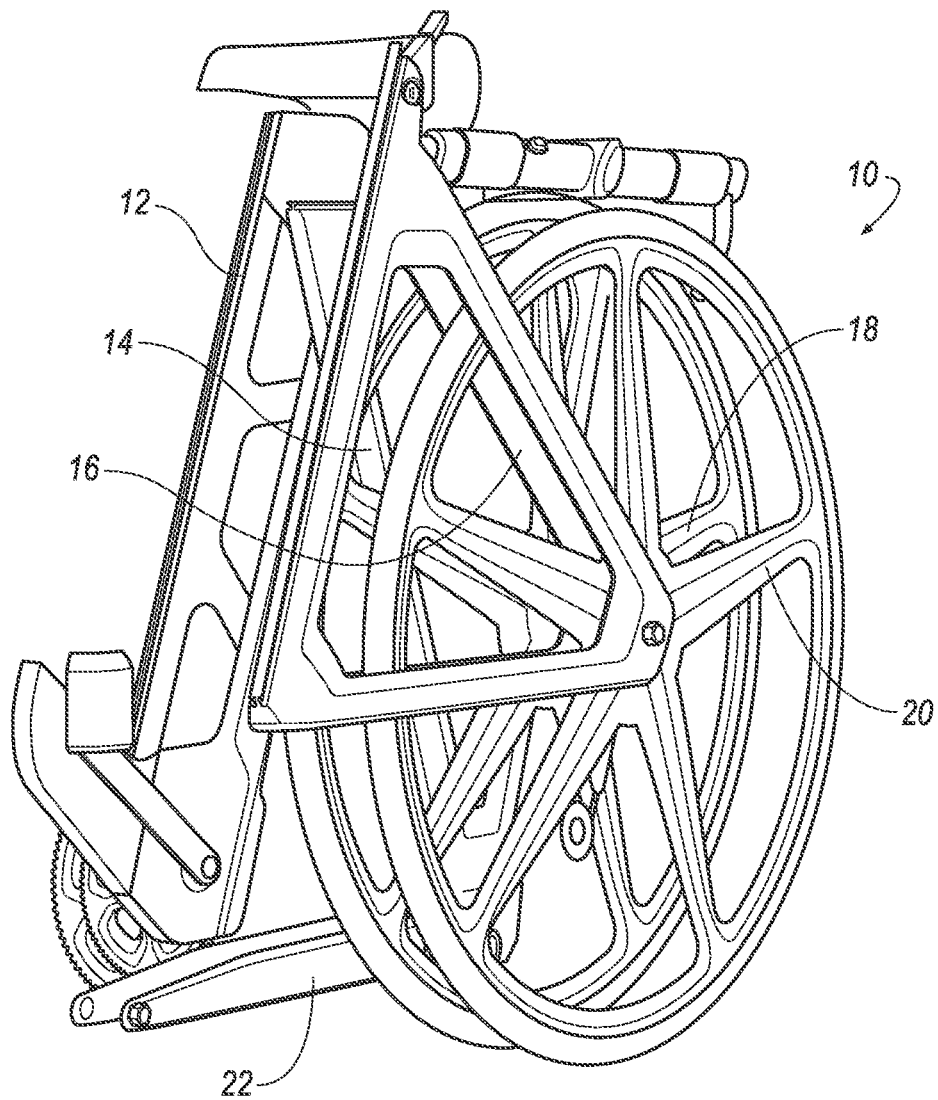
FIG. 17 is a perspective view of the bicycle of FIG. 1 in a stowable configuration.
Figure 18:
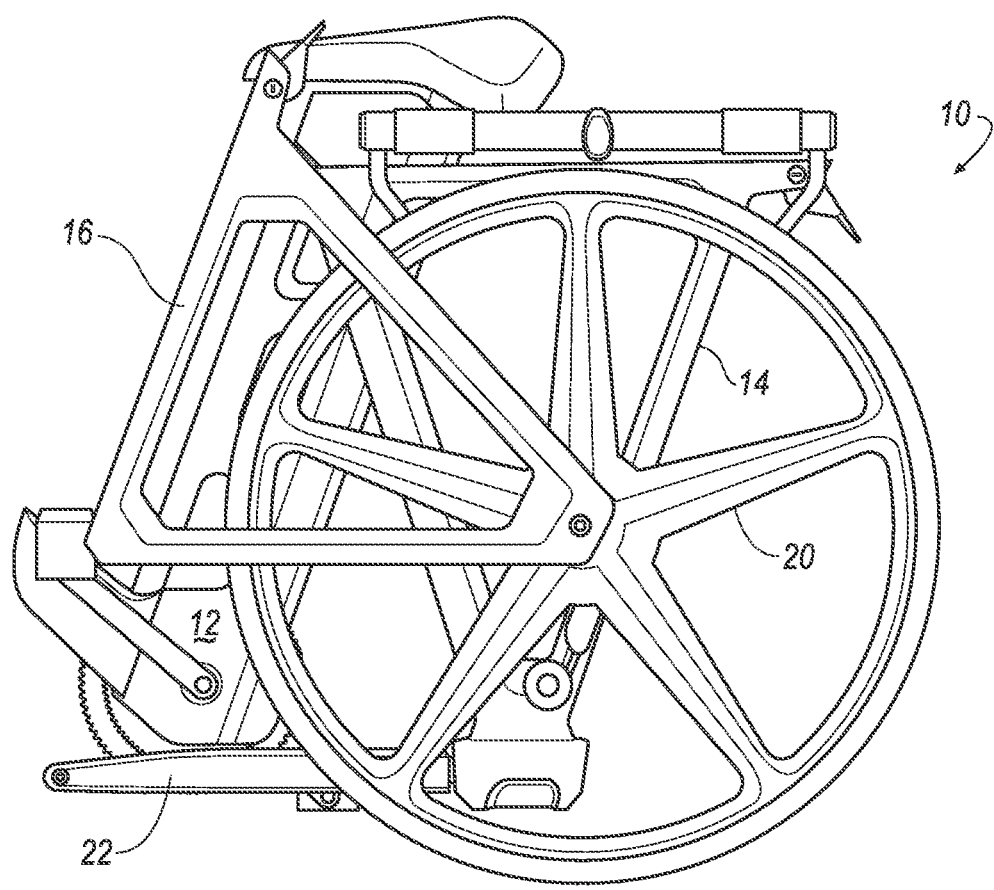
FIG. 18 is a side view of the bicycle of FIG. 1 in a stowable configuration.

FIGS. 17 and 18 illustrate the bicycle 10 in a stowable configuration. Although not visible in these figures, it should be recognized that a connection mechanism such as the mechanism 100 discussed above may be used to secure the wheels 18, 20 to one another, except that for a stowable configuration, a connection mechanism could allow the wheels 18, 22 rotate freely with respect to one another so that the components of the bicycle 10 may be more compactly arranged. In the stowable configuration, the module 12 will generally remain connected to the rear module 16, as shown in FIG. 14, but also could be disconnected. Likewise, the seat 26, handlebars 25 and/or handlebar stem 24 could also be disconnected, or at least lowered to provide a more compact arrangement of the components of the bicycle 10.

Figure 19:
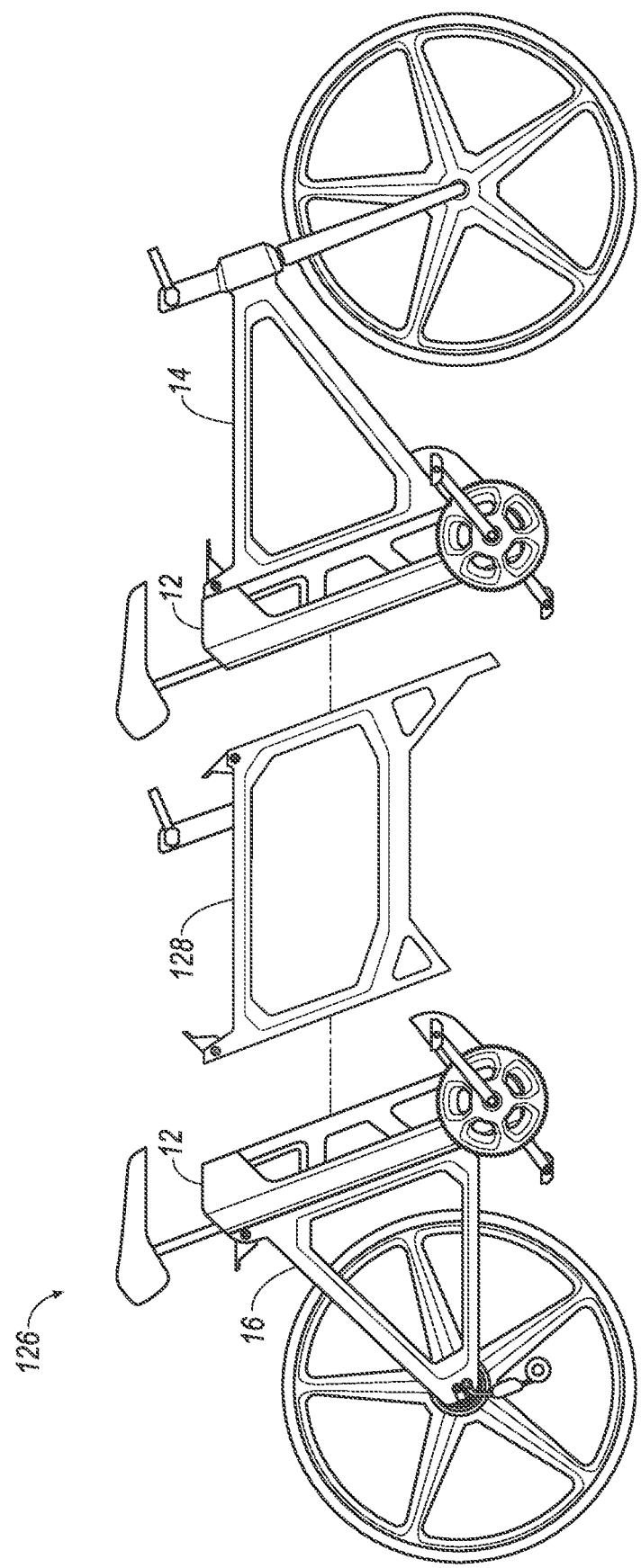
FIG. 19 is an exploded perspective view of an exemplary tandem bicycle.
Figure 20:
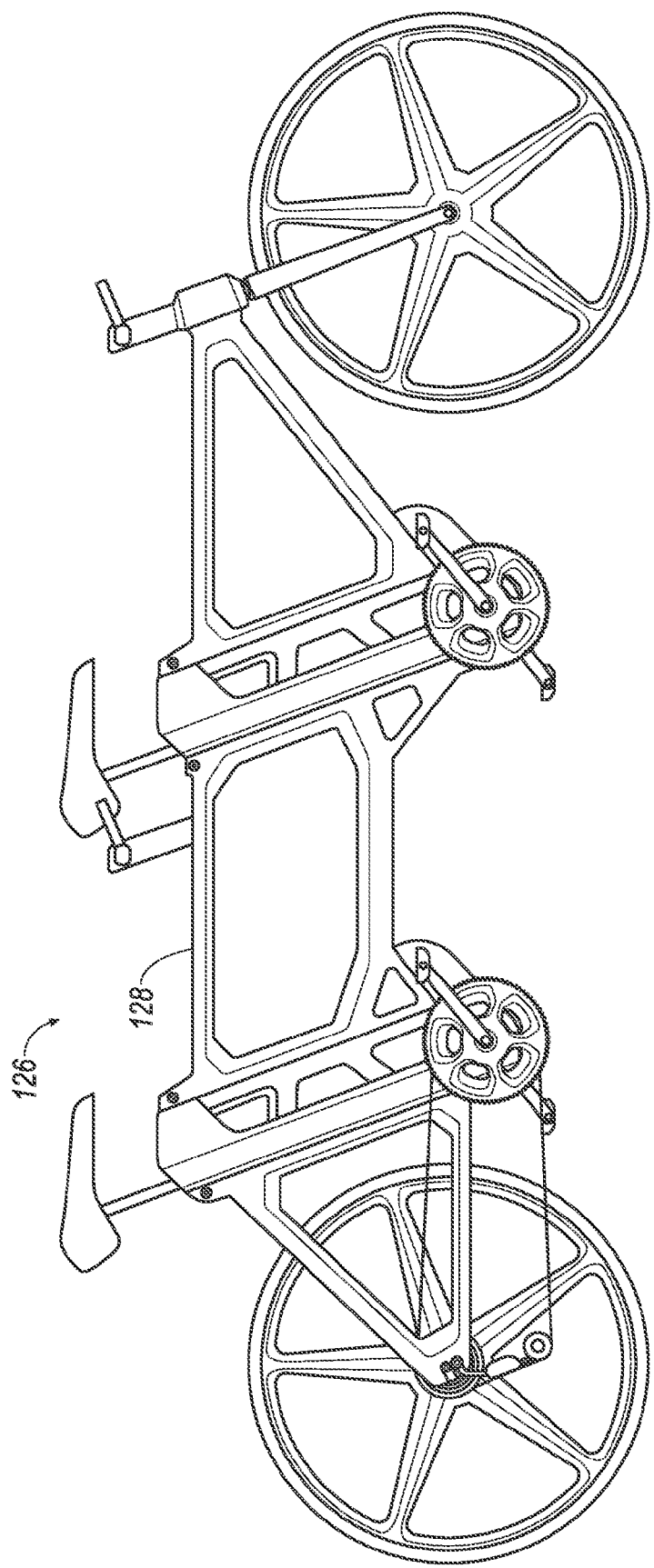
FIG. 20 is a perspective view of the exemplary tandem bicycle of FIG. 19.

FIG. 19 is an exploded perspective view of an exemplary tandem bicycle 126, and FIG. 20 is a perspective view of the tandem bicycle 126. The bicycle 126 can include components similar to the bicycles 10, 10' discussed above, including a front module 14 or 14', a rear module 16 or 16' and one or more center modules 12, 12'. In addition a tandem bicycle 126 may include a bridge module 128 (or a plurality thereof, not shown in the figures for ease of illustration). The bridge module 128 can include elements for connection and securing to the center modules 12, 12' as described above. Accordingly, by simply adding a center module 12, 12' and a bridge module 128 to modules 14, 14', 16, 16' used in a bicycle 10, 10', the bicycle 10,10' can become a tandem bicycle 126. Further, one or more additional bridge modules 128 and center modules 12, 12' could be added to provide a bicycle 126 accommodating three or more riders.

Figure 21:
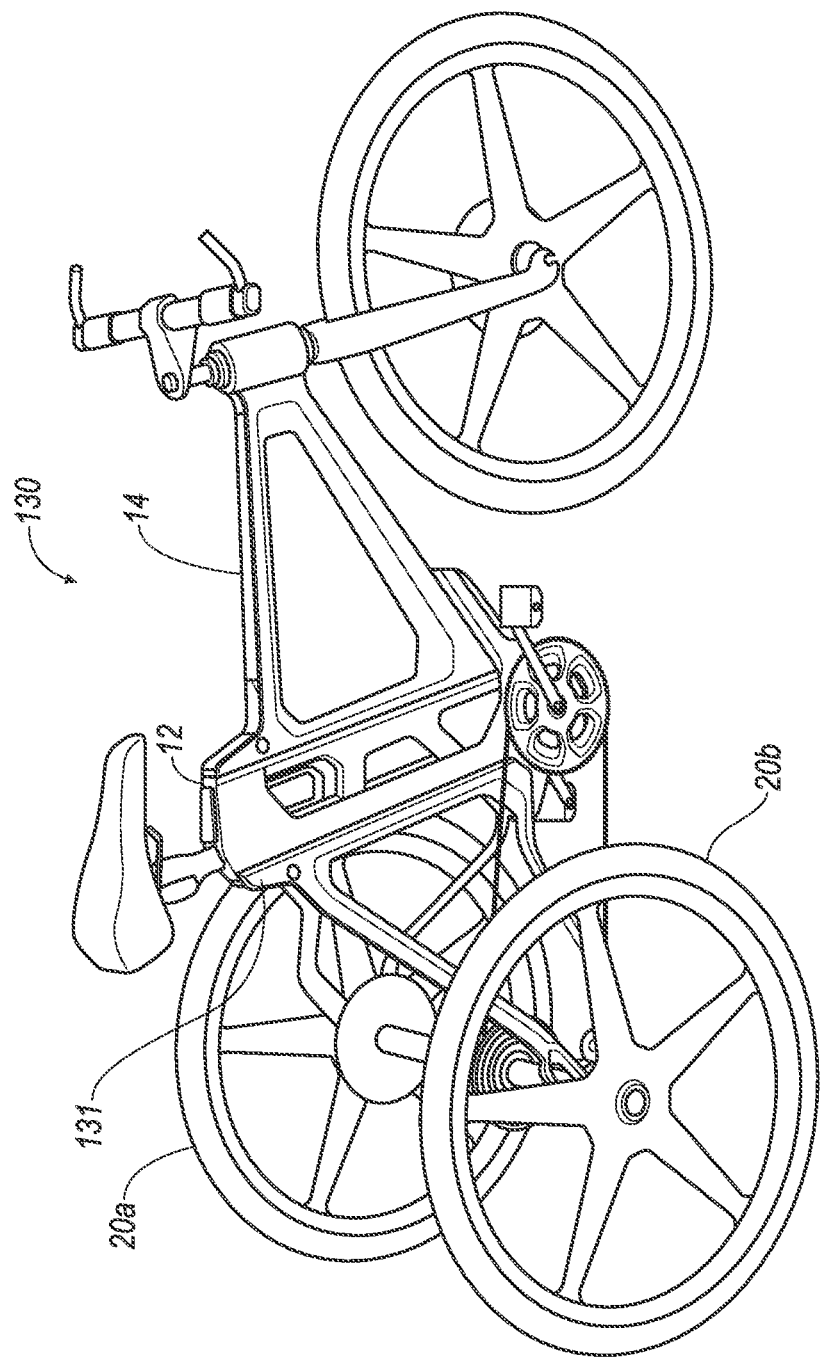
FIG. 21 is an exploded perspective view of an exemplary tricycle.
Figure 22:
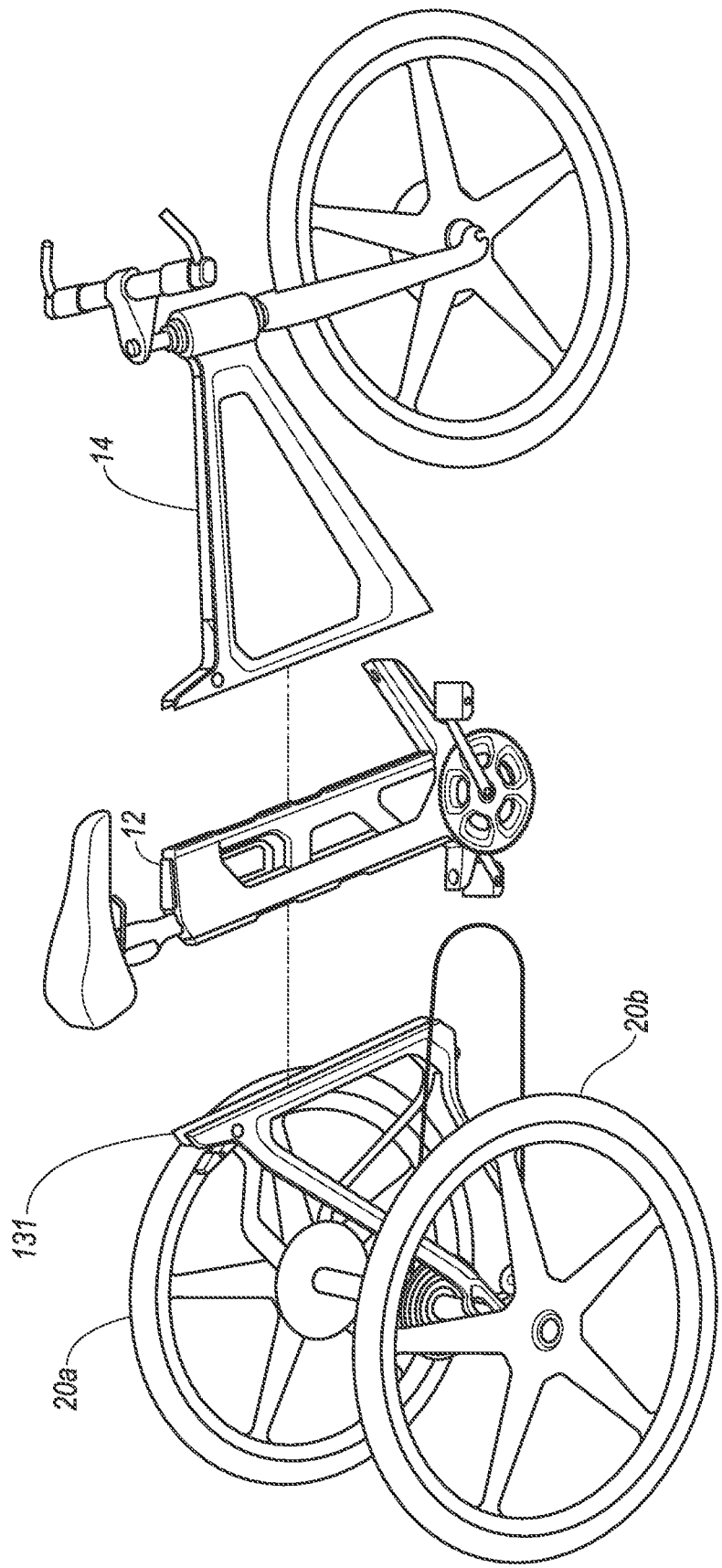
FIG. 22 is a perspective view of the exemplary tricycle of FIG. 21.

FIG. 21 is an exploded perspective view of an exemplary tricycle 130, and FIG. 22 is a perspective view of the tricycle 130. The tricycle 130 includes a center module 12, and a front module 14, such as discussed above. Further, the tricycle 130 includes a rear module 131 having dual wheels 20a and 20b. Thus, in a manner such as described above, the rear module 131 can be easily connected to and disconnected from the center module 12.

Figure 23:
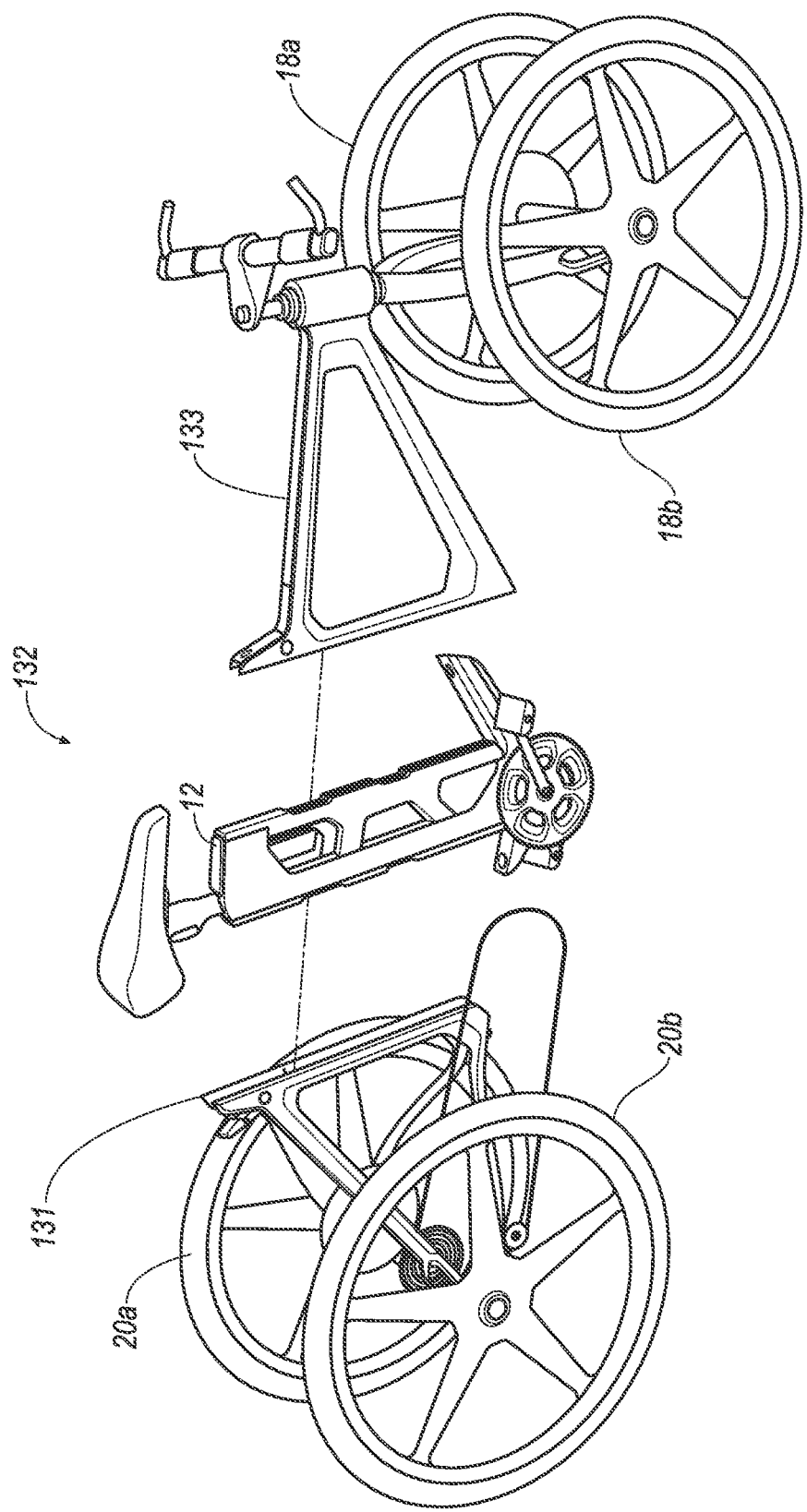
FIG. 23 is an exploded perspective view of an quad-cycle.
Figure 24:
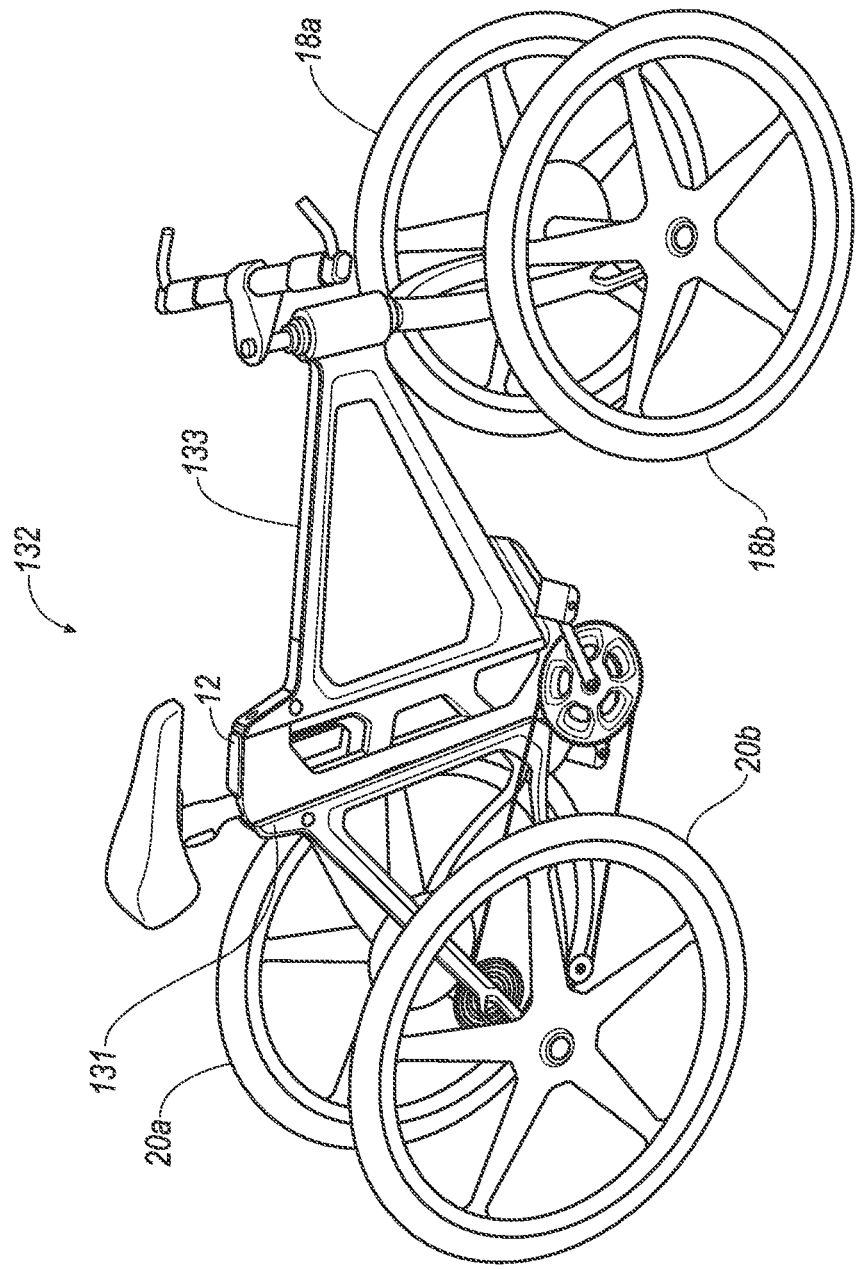
FIG. 24 is a perspective view of the exemplary quad-cycle of FIG. 23.

FIG. 23 is an exploded perspective view of an quad-cycle 132. FIG. 24 is a perspective view of the exemplary quad-cycle 132 of FIG. 23. In addition to a rear module 131, the quad-cycle 132 includes a front module 133 having dual front wheels 18a and 18b. The front module 133, in a manner such as described above, can be easily connected to and disconnected from the center module 12.

Figure 25:
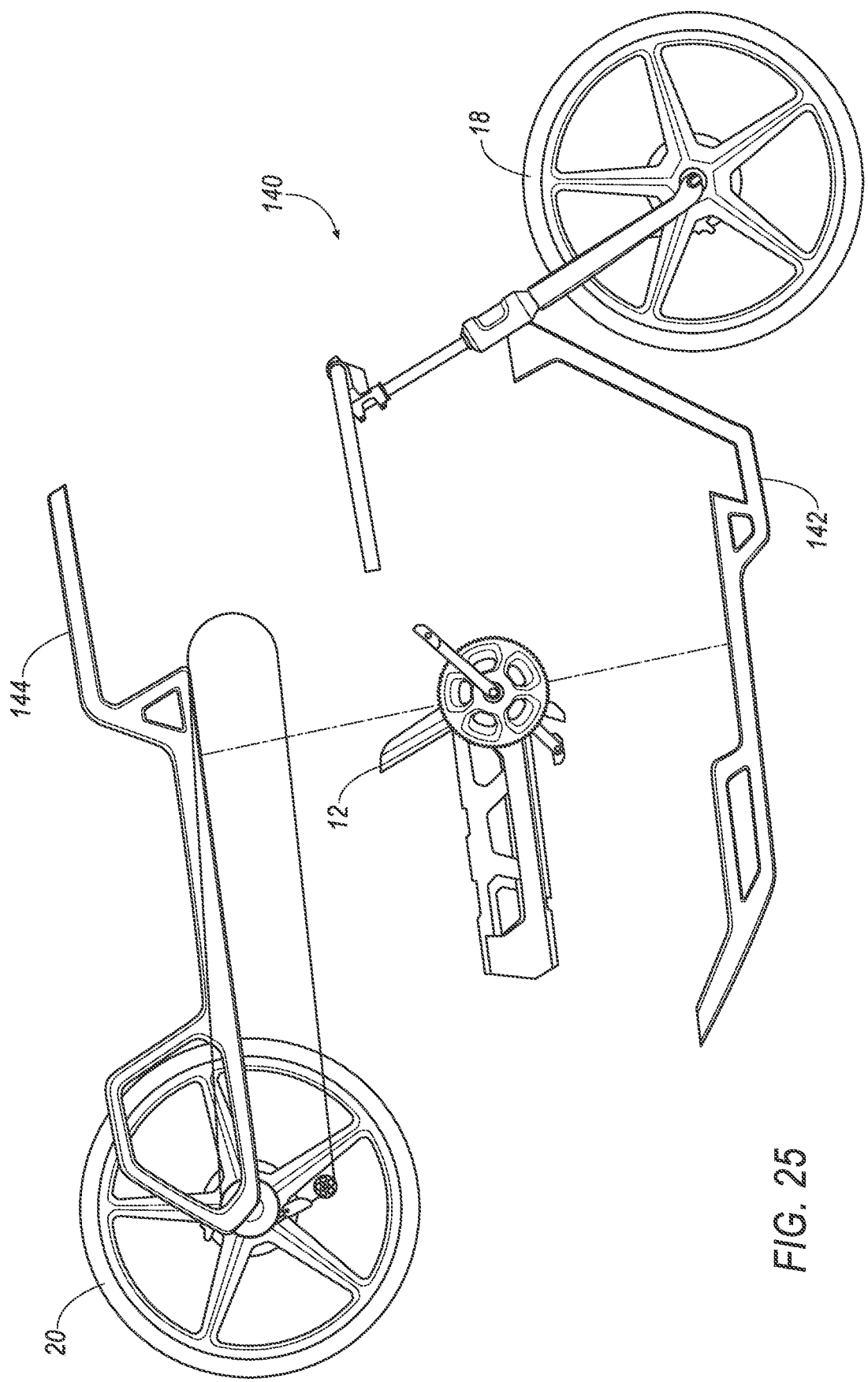
FIG. 25 is an exploded perspective view of an exemplary recumbent bicycle.
Figure 26:
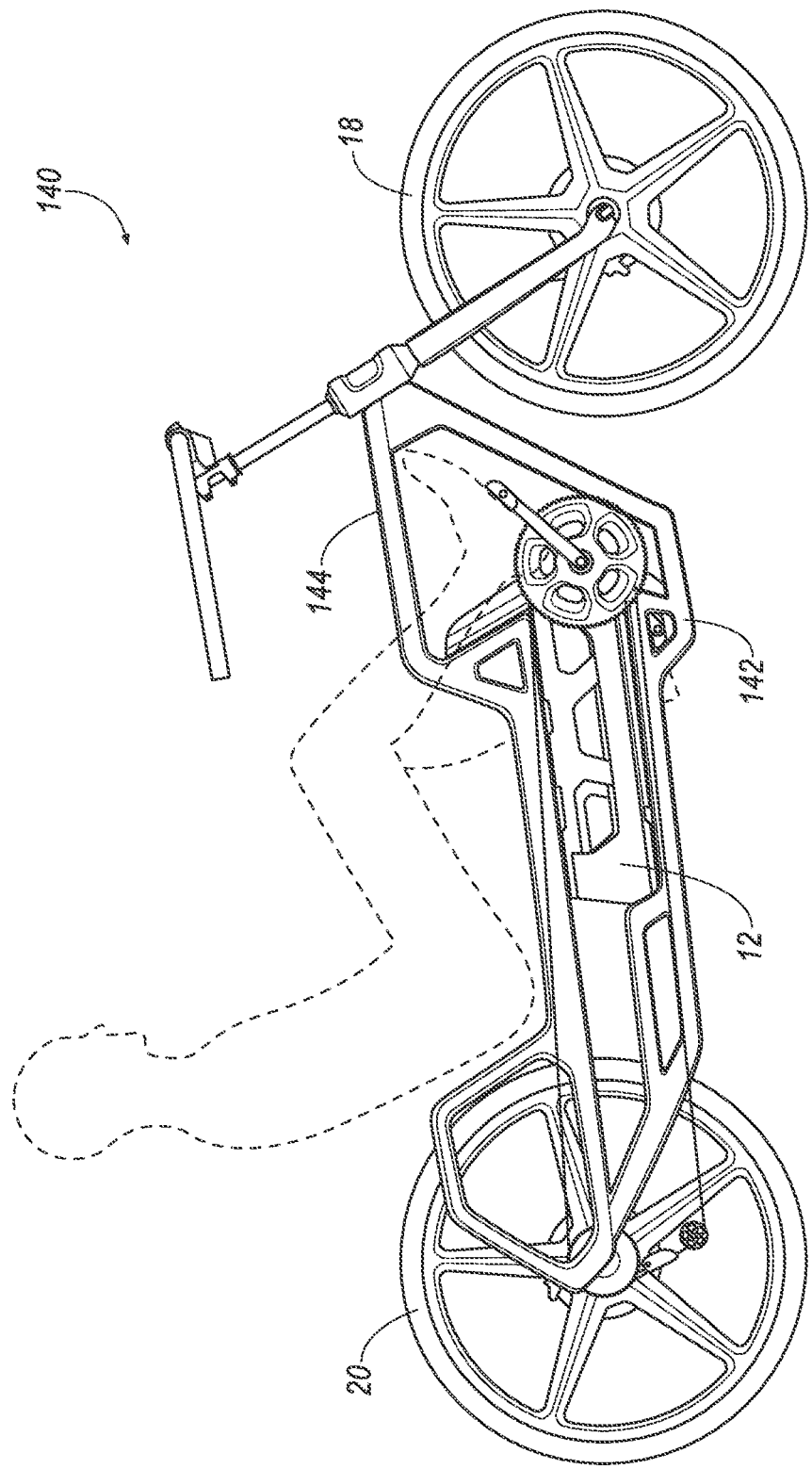
FIG. 26 is a perspective view of the exemplary recumbent bicycle of FIG. 26.

FIG. 25 is an exploded perspective view of an exemplary recumbent bicycle 140. FIG. 26 is a perspective view of the exemplary recumbent bicycle 140. As illustrated, the recumbent bicycle 140 uses in the center module 12 with a front or bottom module 142 and a rear or top module 144. Although the center module 12 is oriented with its longitudinal axis roughly ninety degrees from its orientation in embodiments described above, connections of the center module 12 to the modules 142, 144 may be the same or similar to connections of the center module 12 described above.

Components of the bicycle 10 (including bicycles 10'. tricycle 130, quad-cycle 132), including parts of the modules 12, 14, and 16, may be made from known materials, e.g., carbon fiber materials, aluminum, etc. certain parts of the bicycle 10, e.g., tires 19-21, a seat 26, handlebars 25, etc., may be conventional and even off-the-shelf parts.

As used herein, the adverb "substantially" modifying an adjective means that a shape, structure, measurement, etc. may deviate from an exact described geometry, distance, measurement, etc., because of imperfections in materials, machining, manufacturing, etc.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meaning as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. An apparatus, comprising an e-bike center module, wherein the center module includes:
   at least two center module connecting surfaces including first and second center module connecting surfaces, each of the at least two center module connecting surfaces defining respective connecting surface lines, wherein all connecting surface lines of the center module are in a same plane;
   wherein the first center module connecting surface is releasably connectable to a substantially straight front module connecting surface, and the second center module connecting surface is releasably connectable to a substantially straight rear module connecting surface; and
   further wherein the center module is part of a bicycle frame when the first center module connecting surface is connected to the front module connecting surface and the second center module connecting surface is connected to the rear module connecting surface.

2. The apparatus of claim 1, further comprising a front module that includes the front module connecting surface and a rear module that includes the rear module connecting surface.

3. The apparatus of claim 2, further comprising a second front module having a substantially straight second front module connecting surface, whereby the front module and the second front module are interchangeable for connection to the center module.

4. The apparatus of claim 2, further comprising a second rear module having a substantially straight second rear module connecting surface, whereby the rear module and the second rear module are interchangeable for connection to the center module.

5. The apparatus of claim 2, wherein the front module includes a quick-release and locking mechanism for securing and releasing the front module with respect to the center module.

6. The apparatus of claim 2, wherein the rear module includes a quick-release and locking mechanism for securing and releasing the rear module with respect to the center module.

7. The apparatus of claim 2, further comprising a connector to link the front module and the rear module, whereby the apparatus may be configured in a towable mode.

8. The apparatus of claim 1, wherein at least one of the connecting surfaces includes an electrical connection.

9. The apparatus of claim 1, wherein the front module includes at least one first wheel and the rear module includes at least one second wheel.

10. The apparatus of claim 9, further comprising a quick-release connector for connecting the first wheel and the second wheel.

11. The apparatus of claim 1, wherein the center module includes a removable battery.

12. The apparatus of claim 11, wherein the battery includes an opening to accommodate a security mechanism.

13. The apparatus of claim 11, wherein the center module includes a seat configured to rotate upon an axis for removal and insertion of the battery.

14. The apparatus of claim 1, wherein the first center module connecting surface is slidably connectable to the front module connecting surface, and the second center module connecting surface is slidably connectable to the rear module connecting surface.

15. The apparatus of claim 1, wherein the center module includes an electric motor connected to a driveshaft.

16. The apparatus of claim 15, wherein the driveshaft is linked to a first gear via at least one first one-way clutch, and pedal crank arms are connect to a second gear via at least one second one-way clutch.

17. An apparatus, comprising an e-bike center module, wherein the center module includes:
 a substantially straight first center module connecting surface that is releasably connectable to a substantially straight front module connecting surface; and
 a substantially straight second center module connecting surface that is releasably connectable to a substantially straight rear module connecting surface;
 wherein the center module is part of a bicycle frame when the first center module connecting surface is connected to the front module connecting surface and the second center module connecting surface is connected to the rear module connecting surface; and
 further wherein the center module includes an electric motor.

18. An apparatus, comprising an e-bike center module, wherein the center module includes:
 a substantially straight first center module connecting surface that is releasably connectable to a substantially straight front module connecting surface; and
 a substantially straight second center module connecting surface that is releasably connectable to a substantially straight rear module connecting surface;
 wherein the center module is part of a bicycle frame when the first center module connecting surface is connected to the front module connecting surface and the second center module connecting surface is connected to the rear module connecting surface; and
 further wherein the center module includes a removable battery.

* * * * *